United States Patent [19]

Wong

[11] Patent Number: 5,036,525

[45] Date of Patent: Jul. 30, 1991

[54] ADAPTIVE EQUALIZER

[75] Inventor: Hee Wong, San Jose, Calif.

[73] Assignee: National Semiconductor Corp., Santa Clara, Calif.

[21] Appl. No.: 353,409

[22] Filed: May 17, 1989

Related U.S. Application Data

[62] Division of Ser. No. 108,718, Oct. 14, 1987, Pat. No. 4,873,700.

[51] Int. Cl.$^5$ ............................................. H03K 5/159
[52] U.S. Cl. ....................................... 375/14; 333/18; 364/724.2
[58] Field of Search ....................... 375/11, 14, 76, 99, 375/102, 101, 120; 333/18 R, 28 R; 307/359, 356; 328/162; 360/65; 381/98, 103; 364/724.08, 724.19, 724.2

[56] References Cited

U.S. PATENT DOCUMENTS

| | | | |
|---|---|---|---|
| 3,947,769 | 3/1976 | Rousos | 375/76 |
| 4,387,465 | 6/1983 | Becker | 307/356 |
| 4,449,102 | 5/1984 | Frazer | 328/162 |
| 4,637,036 | 1/1987 | Kobari | 375/101 |
| 4,641,324 | 2/1987 | Karsh | 375/76 |

Primary Examiner—Douglas W. Olms
Assistant Examiner—Stephen Chin
Attorney, Agent, or Firm—Limbach, Limbach & Sutton

[57] ABSTRACT

An adaptive equalizer for compensating input signal frequency and phase distortion introduced in the input signal transmission media is provided. The adaptive equalizer includes frequency selection means for generating an output signal of a selected frequency in response to the input signal and a feedback signal. A comparator slices the equalizer output at predetermined levels. A controller receives the comparator output and provides a controller output representative of the voltage level of the comparator output. A digital filter receives the controller output and generates a corresponding binary signal as the feedback signal to the frequency selection means.

2 Claims, 38 Drawing Sheets

ADAPTIVE EQUALIZER OUTPUT WING FORMS

INPUT = INFO 4

B1, B2, D, E = 23 BIT PRN DATA SEQUENCE

INPUT X'FORMER PRIMARY

EQUALIZER OUTPUT

INPUT X'FORMER PRIMARY

EQUALIZER OUTPUT

20 μSec    1 μSec

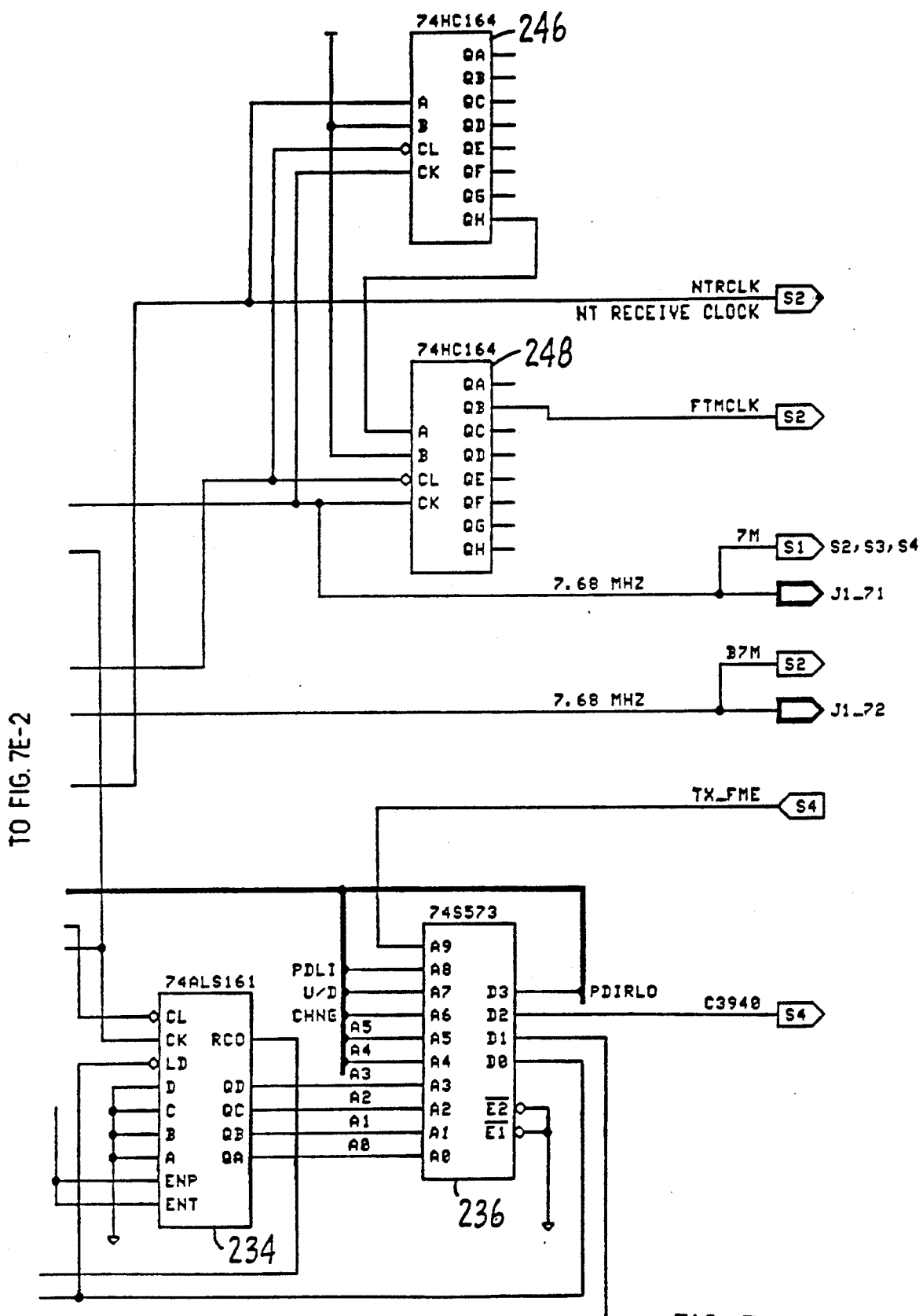

ADAPTIVE EQUALIZER

This is a divisional of application Ser. No. 108,718, filed Oct. 14, 1987, now U.S. Pat. No. 4,873,700.

BACKGROUND OF THE INVENTION

1. Field of the Invention

The present invention relates to data communications systems and, in particular, to auto-threshold/adaptive equalizer circuitry for an integrated services digital network (ISDN) S-interface.

2. Discussion of the Prior Art

Although data communications systems are designed to yield zero intersymbol interference (ISI) during transmission, some amount of residual ISI inevitably occurs due to imperfections in the design or changing channel characteristics. Typically, adjustable filters are included within the system to compensate for this distortion. The process of correcting channel induced distortion is called equalization.

The most commonly used form of adjustable equalizer has been the transversal filter A transversal filter consists, essentially, of a delay line which is tapped at predefined intervals Each tap is connected through a variable gain device to a summing amplifier. By specifying the output value of the equalizer, the required gain settings can be determined This type of equalizer is called a zero forcing equalizer since the equalizer output has an equal number of zero values on either size. Zero forcing equalizers are optimum in that they minimize peak ISI. The primary problem with zero forcing equalizers is that they increase the noise power at the input of the A/D converter typically included in the receiver system.

The design and adjustments of the tap gains of the zero forcing equalizer described above involve the solution of a set of simultaneous equations. In the manual made, the "trimming" of the equalizer requires that a test pulse be sent through the system, the receiving filter output be measured at appropriate sampling times, the tap gains be solved for using appropriate mathematical relationships and, finally, that the gain on each tap be set manually.

To eliminate the need for these time-consuming manual adjustments, automatic systems for setting the tap gains have been developed. These systems are usually divided into two groups. Preset equalizer systems use a special sequence of pulses prior to or during breaks in data transmission. Adaptive equalizers use iterative techniques to arrive at optimum tap gains.

Preset equalizers require an iterative "training" procedure, sometimes involving hundreds of test pulses, to arrive at the desired tap gains. A major problem in "training" a preset equalizer is the presence of noise in the observed equalizer output values. While the effects of noise can be somewhat minimized by averaging the measured output values over a number of test pulses, this averaging technique slows down the rate of convergence.

In an adaptive equalizer, tap gain corrections are continually estimated during the normal course of data transmission. Thus, adaptive equalizers have the ability to adapt to changes during data transmission and eliminate the need for the long training procedures required with preset equalizers. Adaptive equalizers are also more accurate, versatile and cheaper than preset equalizers.

Theoretically, in a simple adaptive equalizer, the output of the equalizer at sampling times should be either plus or minus a preselected value: plus, if the actual input bit corresponding to the sampling time is 1; minus, if the input bit is 0. In an actual system, the equalizer output values will vary about the preselected value, due to ISI, depending on the input sequence. If the ISI is not very large, the transmitted data can be decoded and a sequence of ideal or desired output values is generated. An estimate of the error sequence required for adjusting the tap gains is then generated based on a comparison of the ideal outputs with the actual measured outputs.

SUMMARY OF THE INVENTION

The present invention provides an auto-threshold circuit that allows the receiver of an ISDN S-interface circuit to detect input signals at different amplitude levels. Generation of the threshold level is substantially insensitive to noise as well as to bus contention problems. A novel adaptive equalizer is also provided to compensate frequency and phase distortions introduced in the transmission media. The adaptive equalizer is a simple, low cost design that shares the synthesized threshold level for making continuous error correcting decisions.

The auto-threshold circuit comprises a full-wave peak sensor for accurately estimating slice levels for input signal detection. The peak sensor is qualified such that the auto-threshold circuit does not track an input signal with no modulation. The input signal is windowed with a phase-locked-loop so that the peak sensor is coherent to the input signal, causing the circuit to be insensitive to noise spikes or input distortion outside the window. The auto-threshold circuit includes a digital loop filter which receives the output from an auto-threshold controller and generates a corresponding binary signal which is converted by a digital Sigma/delta modulator to a single bit pulse density modulated signal having a predetermined sampling frequency.

An adaptive equalizer in accordance with the present invention shares the auto-threshold slicing signal for generating its error feedback signal. The adaptive equalizer comprises a frequency selector which generates an output signal in response to the input signal and the feedback signal. As stated above, a threshold comparator slices the equalizer output at predetermined levels. A controller receives the comparator output and provides a controller output representative of the voltage level of the comparator output. A digital filter is then utilized to generate a corresponding binary signal as the feedback signal to the frequency selector. The adaptive equalizer is operable at more than one speed.

These and other features and advantages of the present invention will become apparent and be appreciated by reference to the detailed description of a preferred embodiment of the invention provided below which should be considered in conjunction with the accompanying drawings.

DESCRIPTION OF THE DRAWINGS

FIGS. 7A-1 to 7E-3 combine to provide a schematic diagram illustrating a receiver circuit which incorporates the auto-threshold/adaptive equalizer concepts of the present invention.

DETAILED DESCRIPTION OF THE INVENTION

Figure 1:
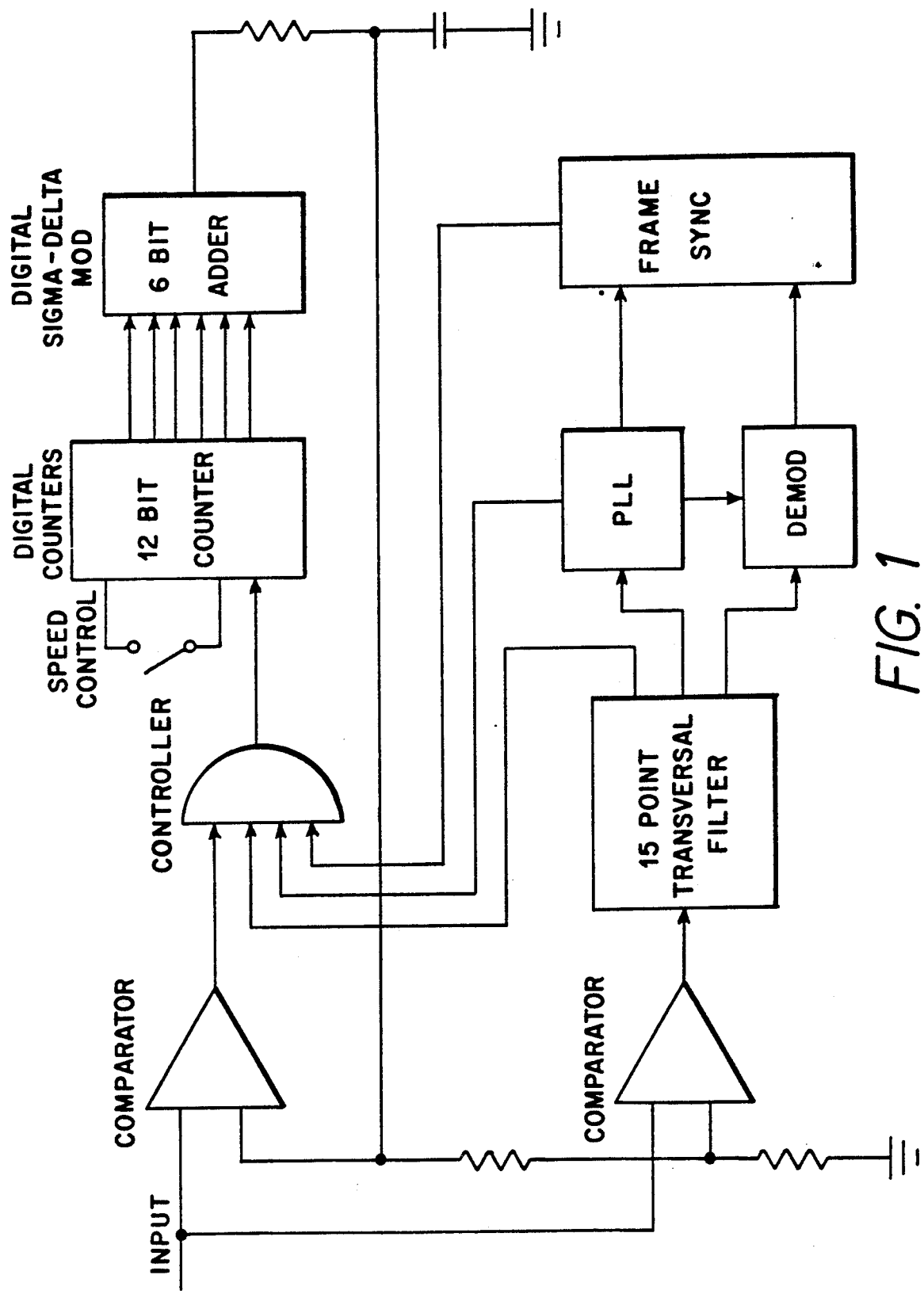
FIG. 1 is a block diagram illustrating an auto-threshold circuit.

An auto-threshold circuit in accordance with the present invention includes full-wave peak sensing circuitry for accurately estimating slice levels for signal detection in a noisy environment, e.g. 200 KHz sine wave interference. The peak sensing circuit is qualified with outputs from 0+/0− filters. Therefore, noise rejection is enhanced. Due to the qualifiers from the 0+/0− filters, the auto-threshold circuit does not track an input signal with no modulation. Therefore, less ripple is produced at the circuit's control voltage output. The peak sensing circuit is coherent to the input signal, windowing the input with a phase-locked-loop, so that the auto-threshold circuit is insensitive to noise spikes or input distortion (due to bus contention) outside the window. In addition, since the auto-threshold circuit operates on the same input signal segments as the adaptive equalizer, as stated above, the synthesized threshold can be shared between these two circuits for error feedback generation. The auto-threshold filter is implemented digitally. The auto-threshold control voltage is generated from a digital Sigma/delta modulator; that is, the circuit utilizes no digital-to-analog converter. The ripple is filtered by a simple RC circuit with a non-critical time constant specification. The loop constant is determined only by the digital loop filter. The Sigma/delta modulator is updated synchronously to the input bit rate. Therefore, switching glitches at the outputs of the slicing comparators are minimized. A block diagram of an auto-threshold circuit in accordance with the present invention is shown in FIG. 1.

Figure 2:
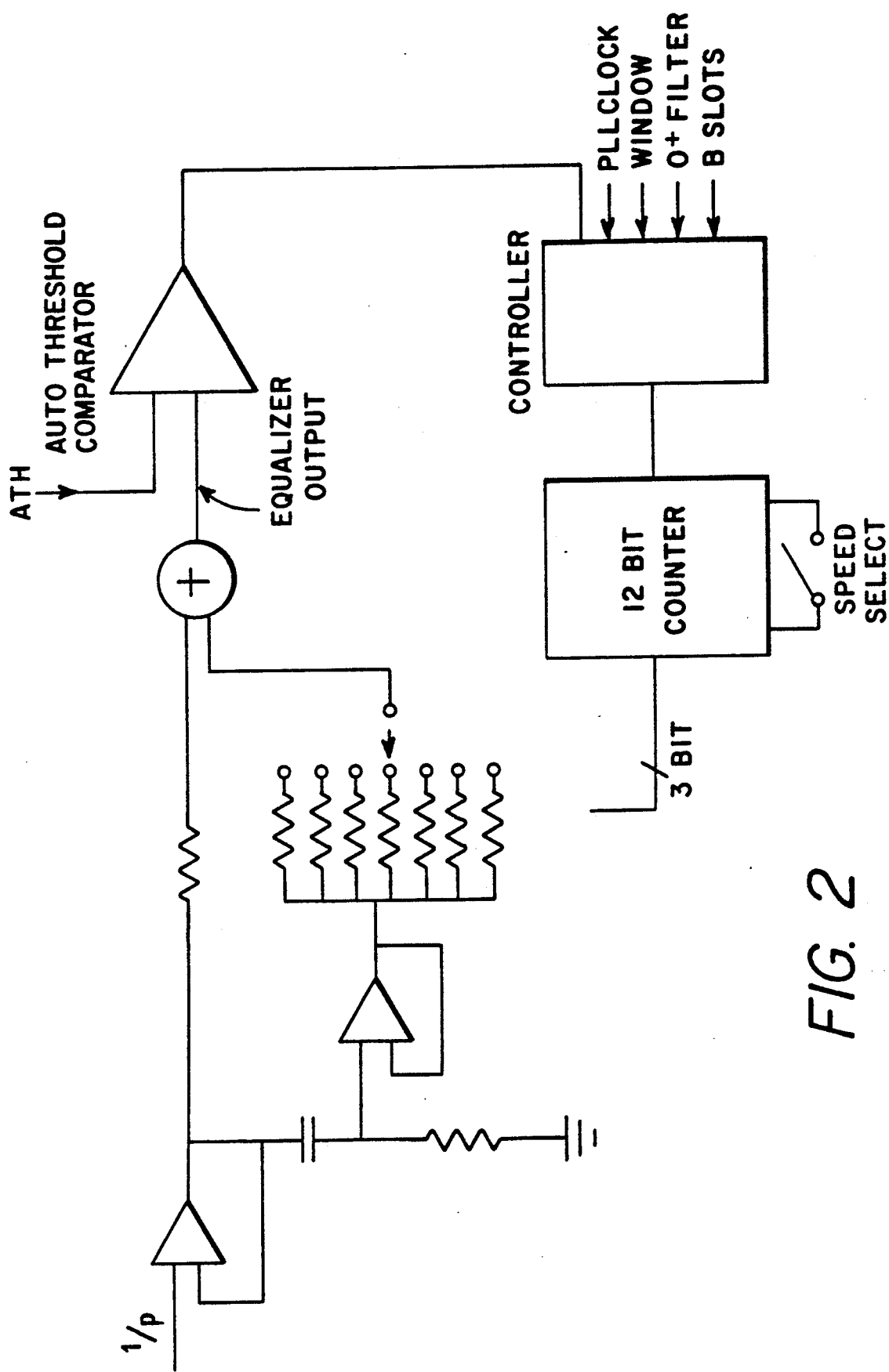
FIG. 2 is a block diagram illustrating an adaptive equalizer circuit in accordance with the present invention.

As stated above, the adaptive equalizer circuit shares the auto-threshold slicing level for generating the error feedback signal. The adapting algorithm is continuous and requires no training sequence. The step changes are synchronous to the input bit rate. Therefore, charge injecting distortion introduced by the analog switches during step changes can be placed at the middle of the 0+ pulses. This arrangement results in no degradation in detection accuracy while maintaining a simple circuit configuration. The loop filter has two tracking speeds and is implemented digitally. A block diagram of an adaptive equalizer circuit in accordance with the present invention is shown in FIG. 2.

Both the adaptive equalizer and the auto-threshold circuits are placed in the "hold" mode during some bit periods. Signal imperfections in these bits are ignored by these circuits.

A receiver circuit which incorporates the autothreshold/adaptive equalizer concepts of the present invention is shown schematically in FIGS. 7A-1 to 3E-3. Referring to FIG. 3A-I, the reciever circuit includes a receiver front end and adaptive equalizer in accordance with the present invention. The front end and adaptive equalizer includes an input transformer 10 with a 1:1 ratio to prevent overloading of the buffers and the equalizer. The output of the transformer 10 drives a unity gain buffer and low-pass filter consisting of buffer 12, 2.7K resistor 14 and 47 pF capacitor 16 and having a −3 dB roll-off at a frequency of 1.25 MHz. The output of the unity gain buffer 12 is provided to a line equalization high-pass filter which consists of buffer 18 and an input RC consisting of 4.7K resistor 20 and 250 pF capacitor 22. The high-pass filter has a −3 dB roll-off at a frequency of 135 KHz. An amplifier 24, together with 1K resistor 26, 10K resistor 28, and 2.2K resistor 30, combine to form an inverting/summing amplifier which generates the equalizer output with a gain of 2.33. The amount of equalization is controlled by binary code at input pins C (msb), B and A of component 19 and it's seven associated resistors. There are eight possible steps, with a "0" binary code equalling a flat response.

Figure 3:
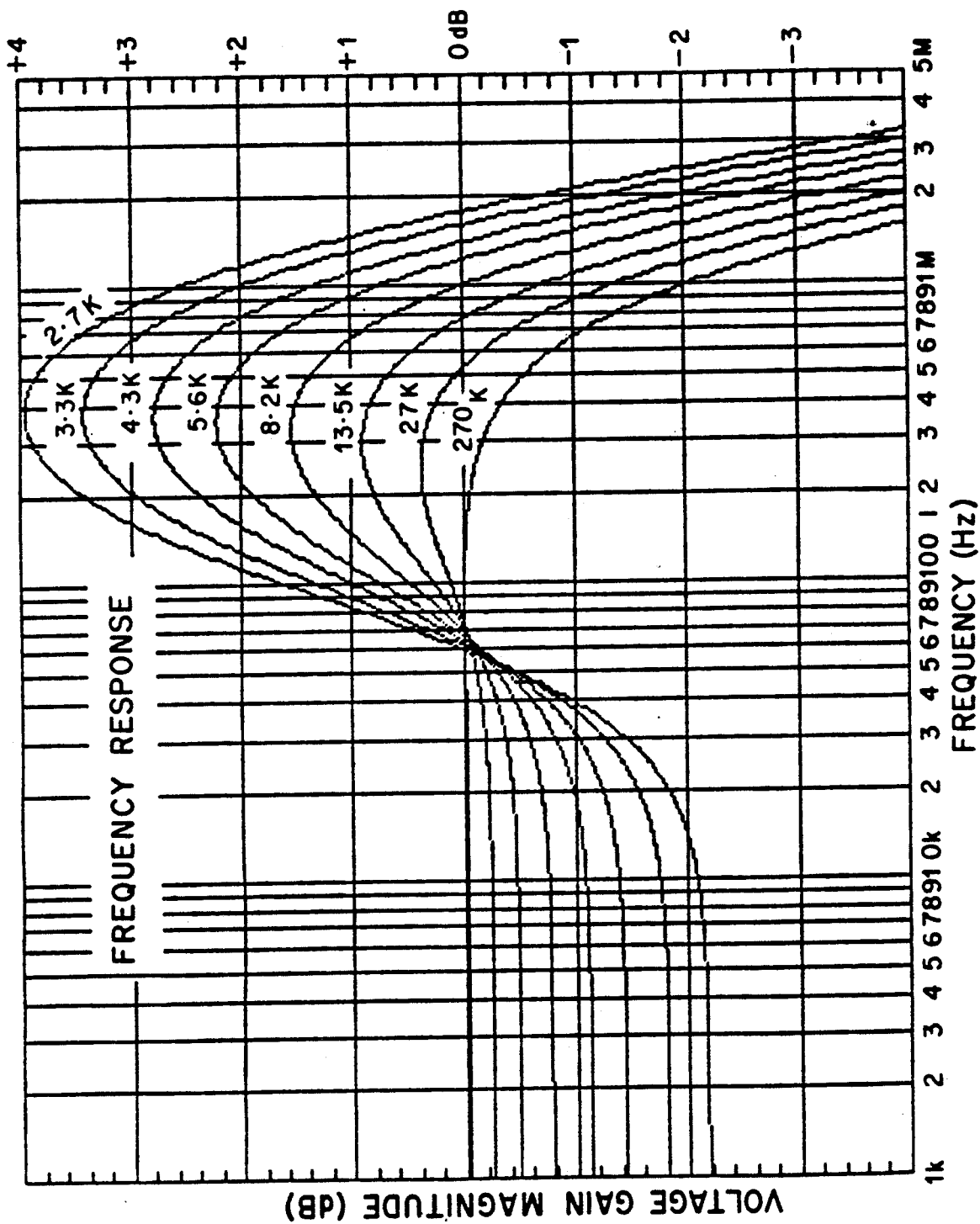
FIG. 3 is a graph illustrating the frequency response of an adaptive equalizer in accordance with the present invention.
Figure 4:
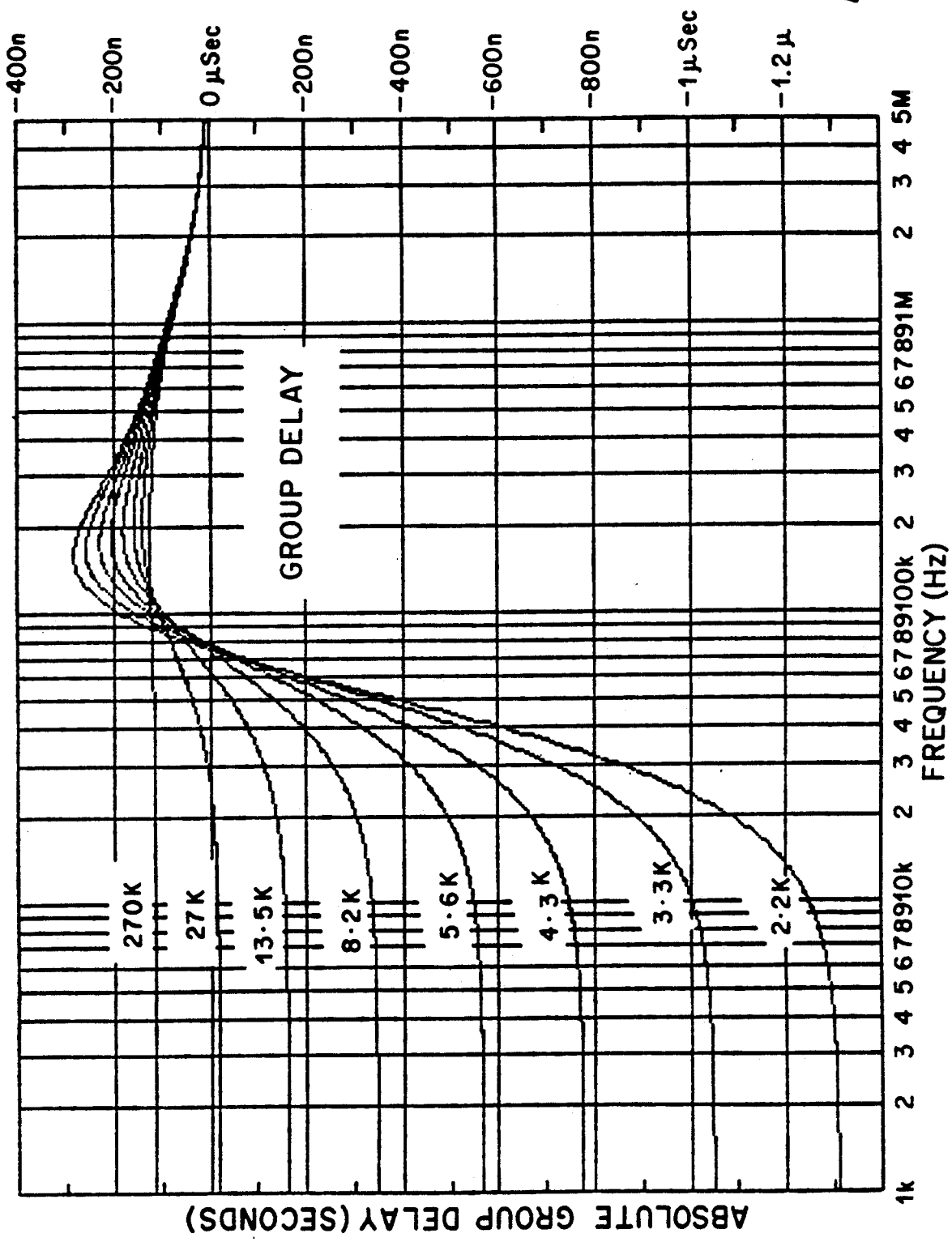
FIG. 4 is a graph illustrating the group delay of an adaptive equalizer in accordance with the present invention.
Figure 5:
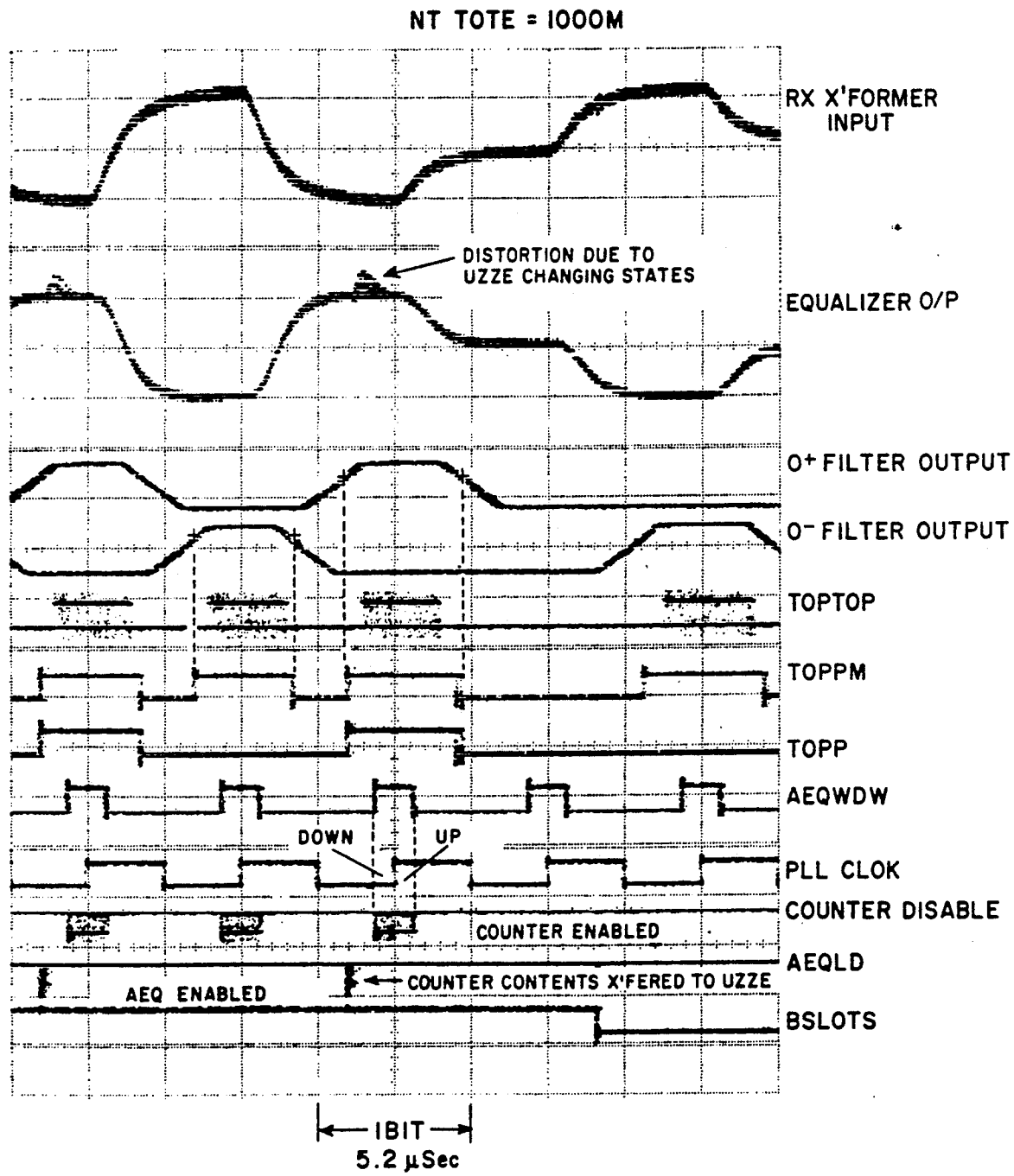
FIG. 5 is a timing diagram illustrating the waveform associated with an adaptive equalizer in accordance with the present invention.
Figure 6A:
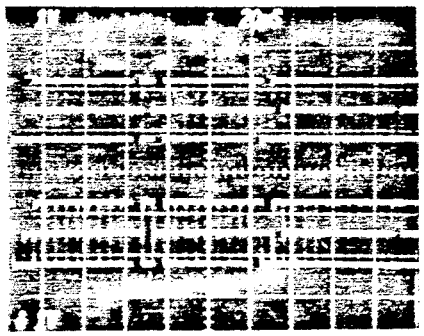
FIG. 6A is a graph illustrating a comparison between the input and output of an adaptive equalizer in accordance with the present invention for short (approx. 0 meter) transmission cables.
Figure 6A:
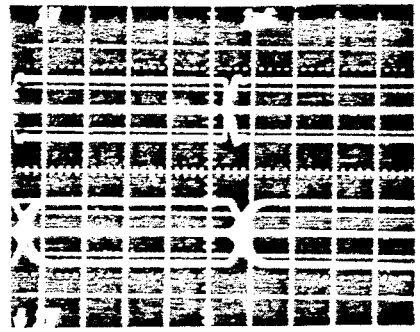
Figure 6A:
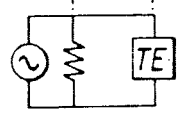
Figure 6B:
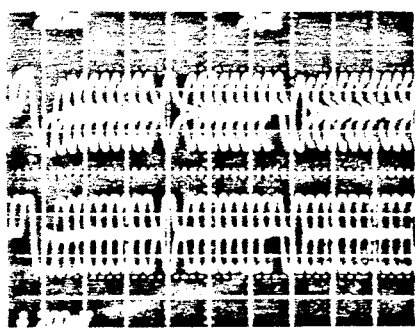
FIG. 6B is a graph illustrating a comparison between the input and output of an adaptive equalizer in accordance with the present invention for longer (approx. 500 meters) transmission cables.
Figure 6B:
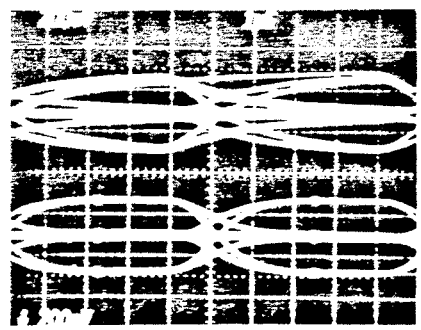
Figure 6B:
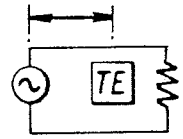

FIGS. 3 and 4 provide plots of the frequency response and group delay, respectively, of the adaptive equalizer described herein; FIG. 5 provides its timing diagram. FIGS. 6A and 6B illustrate the effect of the adaptive equalizer on the signal over short and long transmission distances, respectively.

Figures 1, 7A:
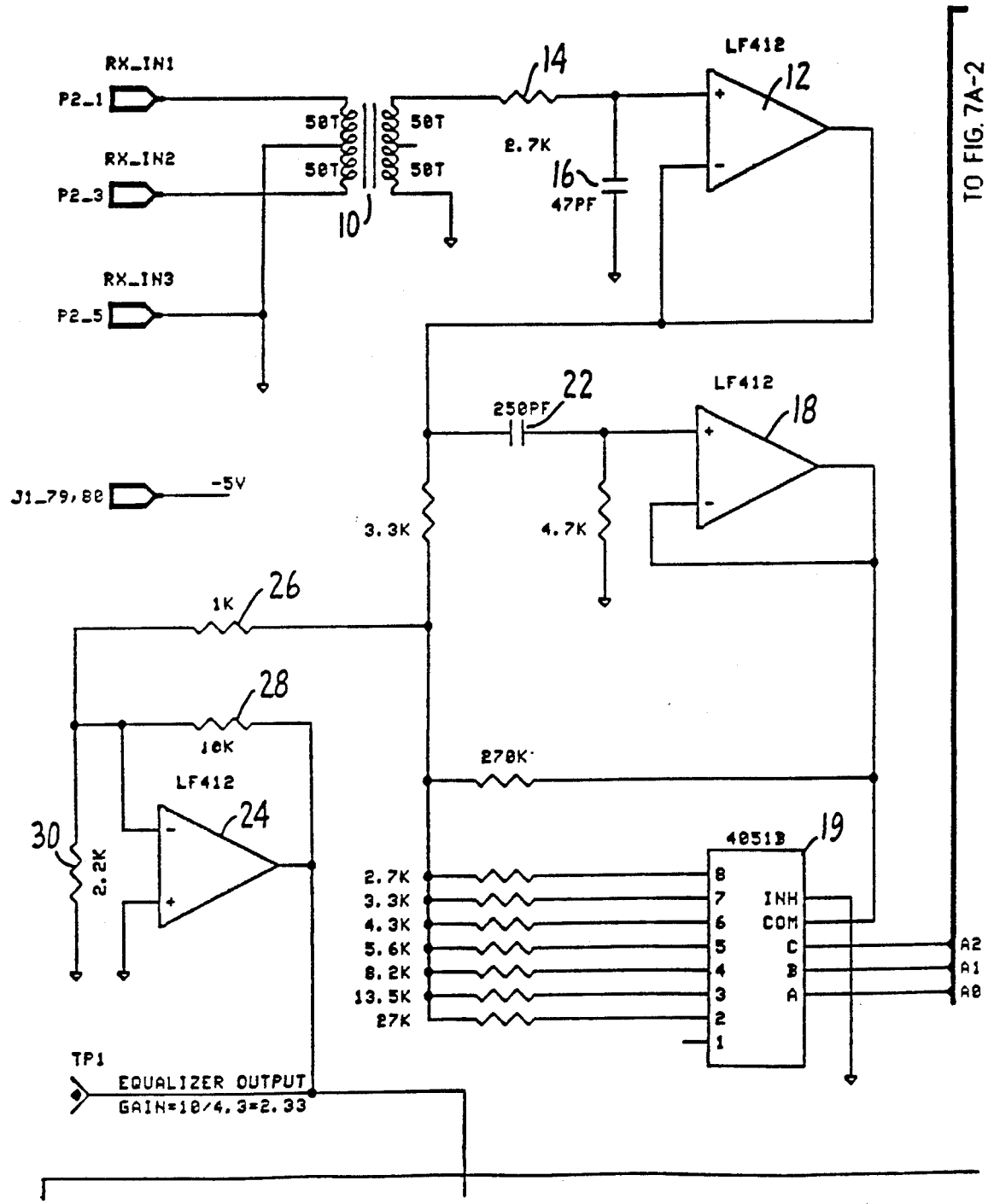
Figures 2, 7A:
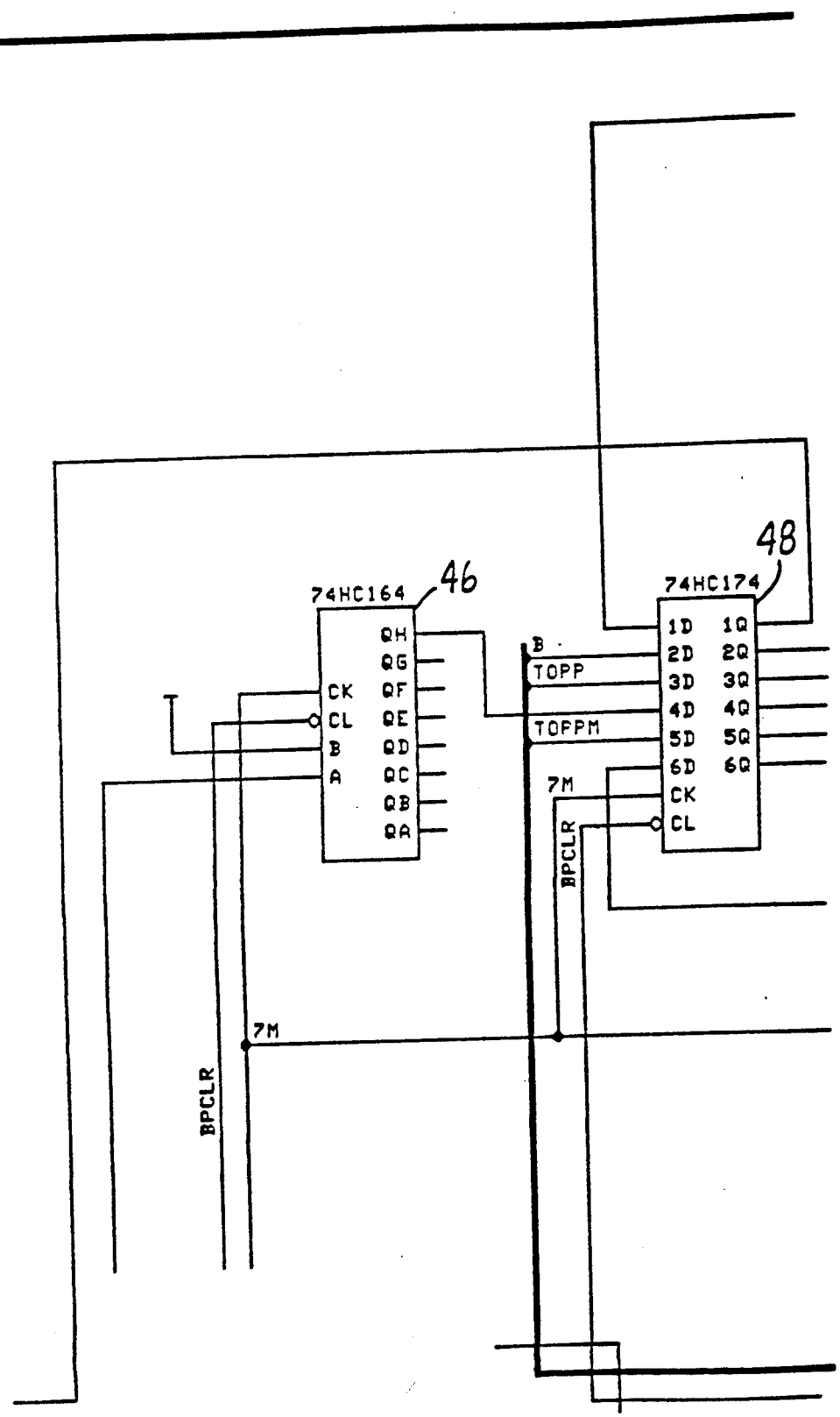
Figures 3, 7A:
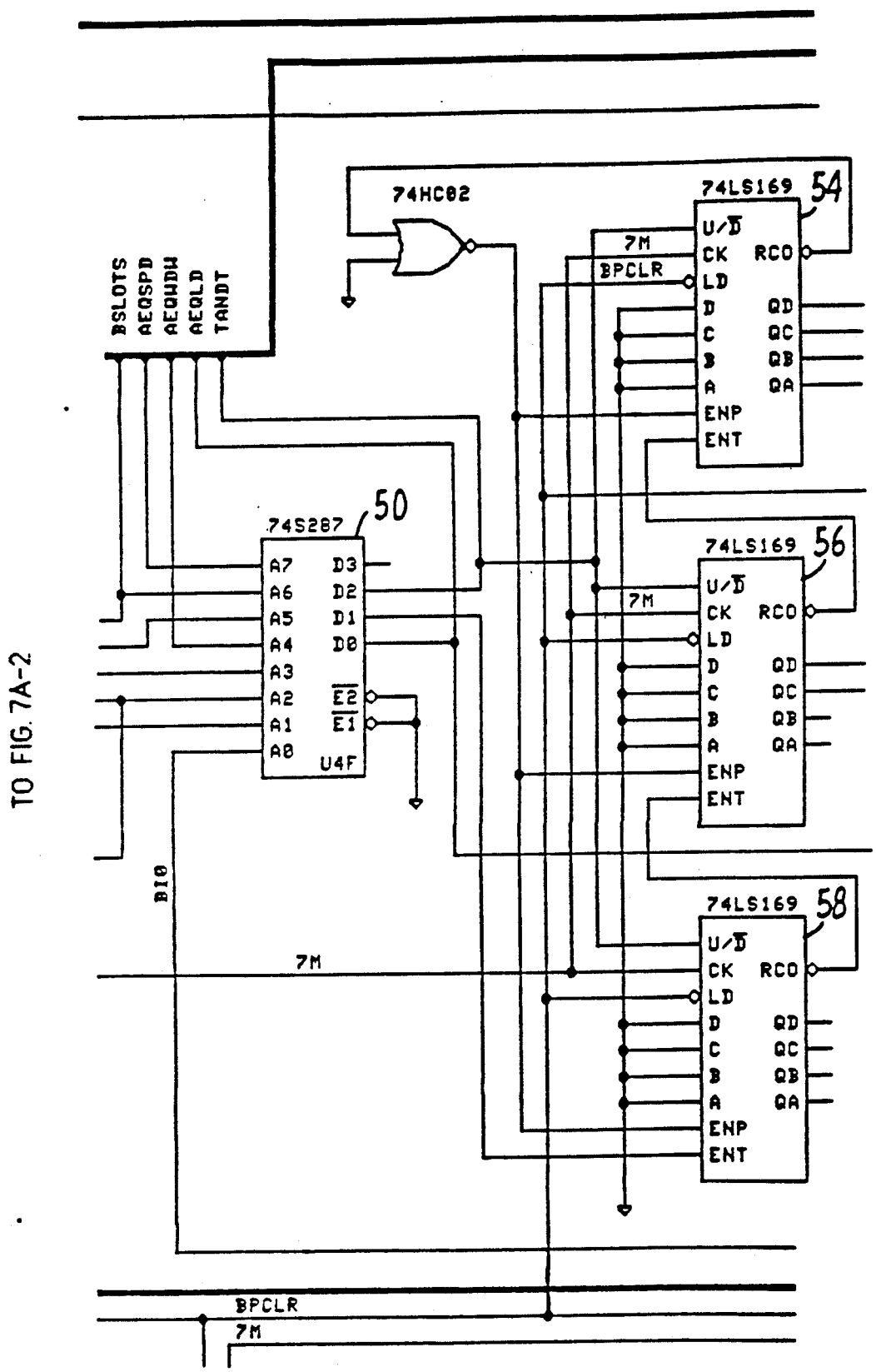
Figures 4, 7A:
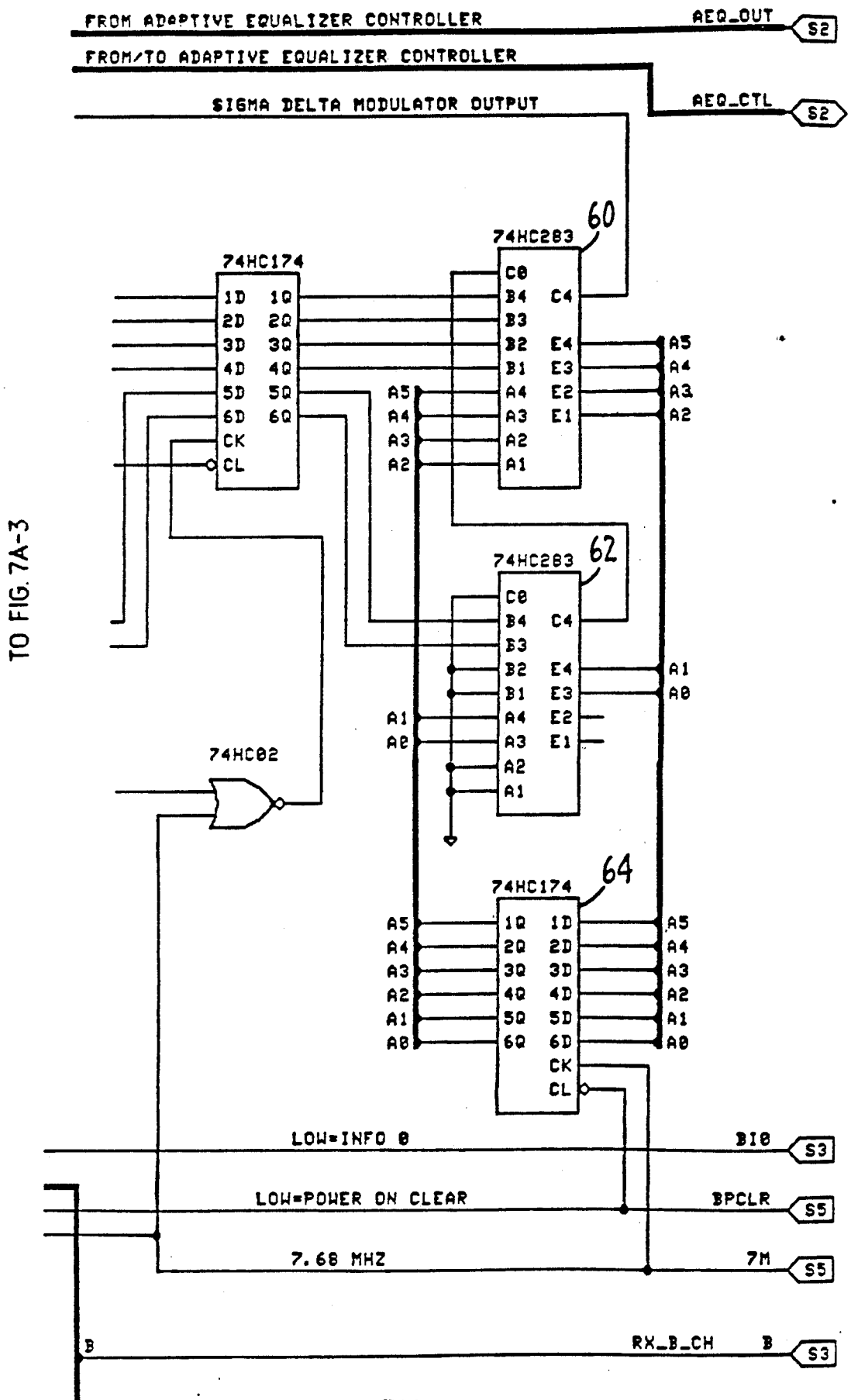
Figures 5, 7A:
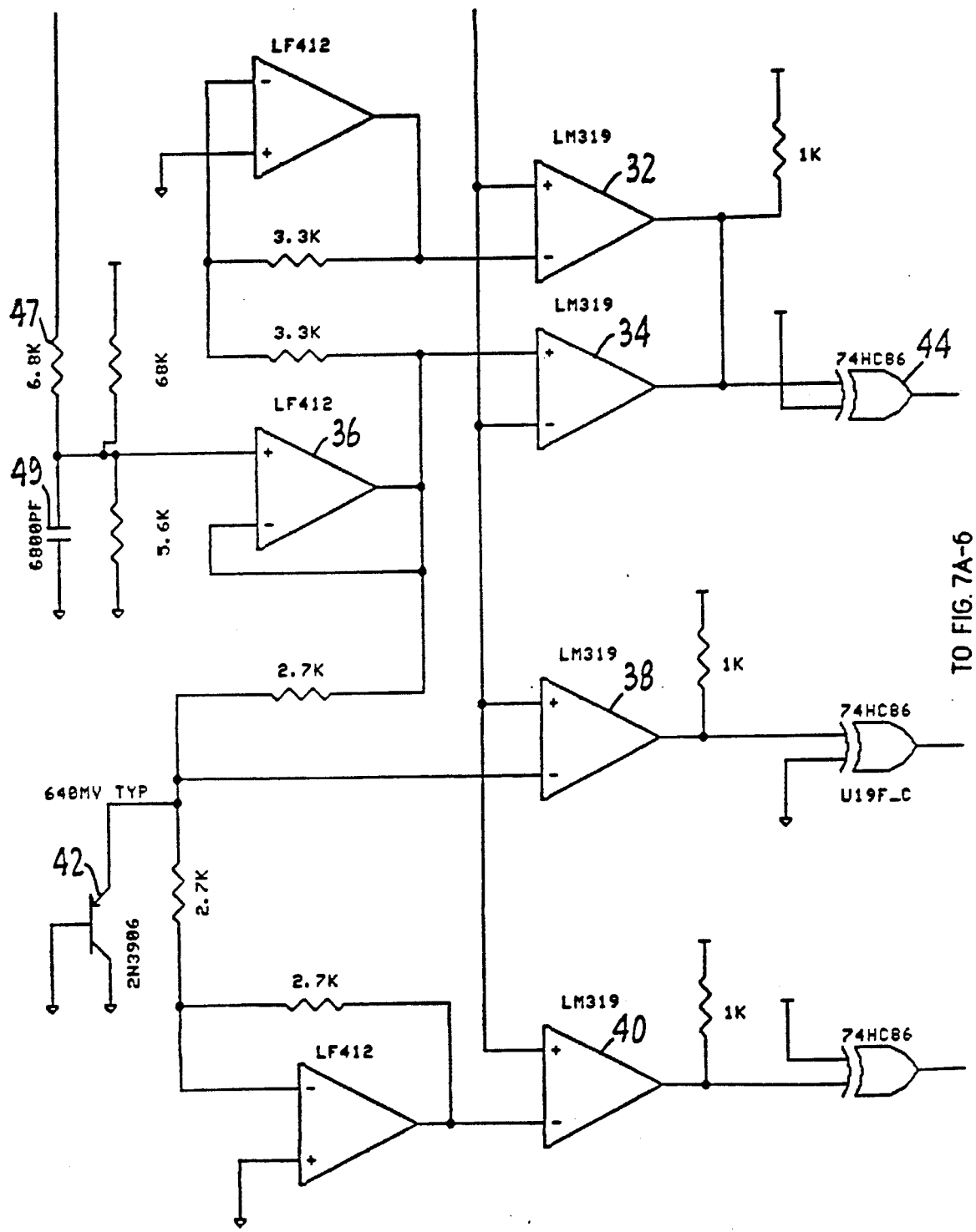

The equalizer output signal from component 24 is provided to a group of input slicers and level translators (see FIG. 7A-5). Components 32 and 34, together with an auto-threshold controller, which is described in detail below, form a full-wave, peak-voltage tracking loop. The voltage reading $V_{ath+}$ at the positive input of component 34 is a measure of the peak voltage of the equalizer output, i.e. 0.5 volts denotes the output amplitude=0.5V peak or 1V peak-to-peak. If the output amplitude is below 0.22 or above 2.33V, then $V_{ath+}$ will be limited to 0.22 or 2.33V, respectively. This is accomplished by the resistor "T" network at the positive input of component 36.

If voltage $V_{ath+}$ is normalized to 1, then the voltage $V_{ath-}$ at the negative input of auto-threshold O-comparator 32 is −1V, the voltage VO+ at the negative input of 0+signal-detection slicer 38 is 0.5V, and the voltage VO− at the negative input of O− signal detection-slicer 40 is −0.5V.

If voltage $V_{ath+}$ exceeds 1280 mv, then VO+ and VO− are clamped to 640 millivolts and −640 millivolts, respectively. The clamping function is necessary when the circuit operates in the network terminating mode with multiple-terminal nodes TE connected to the bus. Otherwise the nearby TEs would drive the VO+ or the VO− threshold levels above the received signal peaks from the remote TEs, causing detection errors.

The PNP transistor 42 connected to the negative input pin of component 38 provides the clamping function.

A cross-reference table showing the relationship between the voltage levels is provided in Table 1.

TABLE 1

| X' Former Secondary | $E_q$ O/P | $V_{ath+}$ | VO+ |
|---|---|---|---|
| 1 $V_{peak}$ (+2.5 dB) | 2.33 $V_{peak}$ | 2.33 V | 0.64 V |
| 0.89 $V_{peak}$ (+1.5 dB) | 2.07 $V_{peak}$ | 2.07 V | 0.64 V |
| 0.75 $V_{peak}$ (0 dB) | 1.74 $V_{peak}$ | 1.74 V | 0.64 V |
| 0.55 $V_{peak}$ (−2.7 dB) | 1.28 $V_{peak}$ | 1.28 V | 0.64 V |
| 0.50 $V_{peak}$ (−3.5 dB) | 1.17 $V_{peak}$ | 1.17 V | 0.58 V |
| 0.32 $V_{peak}$ (−7.5 dB) | 0.74 $V_{peak}$ | 0.74 V | 0.37 V |
| 0.09 $V_{peak}$ (−18.0 dB) | 0.22 $V_{peak}$ | 0.22 V | 0.11 V |
| 0 $V_{peak}$ | 0 $V_{peak}$ | 0.22 V | 0.11 V |

Note: $V_{ath-} = -V_{ath+}$, VO− = −VO+

The output of auto-threshold comparators 32 and 34 is provided to an auto-threshold controller. More specifically, the output of auto-threshold comparator 34 is provided through XOR gate 44 and pipelined through components 46 and 48 (see FIG. 7A-2), its destination being auto-threshold controller ROM 50 (see FIG. 7A-3). The coding program "ATHCTL.src" for auto-threshold controller ROM 50 is provided as Appendix A at the end of this specification.

The signal at pin A3 of ROM 50 is named "TOPP", and, if high, shows the 0+ pulse from the equalizer is either higher than $V_{ath+}$ or the 0− pulse is lower than $V_{ath-}$ (0+ and 0− pulses are exclusive). The TOPP signal is used to generate the error feedback control for the loop. Under normal operation, the control loop will "track out" the voltage differences causing TOPP to bounce between 0V and 5V.

There are three qualifiers connected to auto-threshold controller ROM 50. The first qualifier is provided by center estimating ROM 52 (see FIG. 7A-7) and is the sliced output from the 0+ and 0− filters. This signal, named "TOPPM", if high, indicates that the TOPP output is due to a "healthy" pulse, i.e., one not caused by noise. The "TOPPM" signal also indicates when the input signal has no modulation, i.e., binary 1's imbedded in the input stream. In this case, $V_{ath+}$, as well as $V_{ath-}$, retain the previous value during the binary 1's period, resulting in less ripple in the control voltage.

The second qualifier input to ROM 50 is provided by the adaptive equalizer and is identified as "AEQWDW". This qualifier allows the auto-threshold circuit to operate on the same input signal segments as the adaptive equalizer.

The third input to ROM 50 is from the frame synchronizer/lock detector, to be described below, and is identified as "BSLOTS". This signal enables the auto-threshold circuit from the second "B" bit to the bit after the last "B" bit in the B1 and B2 channels. The function of the BSLOTS input is to prevent the auto-threshold circuit from responding to other bits which may contain distortion due to bus contention.

The signal "AEQSPD", applied to pin A7 of ROM 50, is derived from the frame synchronizer/lock detector, which is set high after frame-in-lock plus eight additional frames, is used to enable/disable the qualifiers. When AEQSPD is set low, the TOPP output is qualified with TOPPM only, so that $V_{ath+}$ or $V_{ath-}$ ramps up at maximum speed. After signal ASQSPD is set high, TOPP is qualified with TOPPM, AEQWDW and BSLOTS, so that the activities of the auto-threshold circuit are limited to a fraction of a bit period within the B channels for rejecting unwanted input imperfections.

Components 54, 56 and 58 (see FIG. 7A-3) form an error integrator for the control loop. The error integrator, up/down controlled by the TOPP signal, is enabled during the period defined by the qualifiers During the window openings, the integrator counters either count up if the input signal is less than $V_{ath+}$ or count down if the input signal is more than $V_{ath+}$. The opposite is true for $V_{ath-}$.

The signal TOPP, which is applied at pin D3 of ROM 50 and derived from the center estimating ROM 52, is the sliced 0+ filter output. This signal is similar to TOPPM except that there is no output for the 0− input pulses. During the rising edge of the TOPP signal, the integrator's output is transferred to a Sigma/delta modulator, described below.

The Sigma/delta modulator, consisting of components 60, 62 and 64 (see FIG. 7A-4), converts the binary output from the integrators 54, 56, 58 to a 1 bit pulse density modulated PDM signal having a 7.68 MHz sampling frequency. The modulator is functionally equivalent to a conventional 6 bit digital-to-analog converter (DAC). The output of the modulator is available at the "carry" pin, i.e. pin C4, of adder circuit 60. The output is then pipelined through component 48 and converted into a DC control voltage after the RC network consisting of 6.8K resistor 47 and 6800 pF capacitor 49, connected at pin 1Q of component 48. The RC time constant is set at 20 microseconds, which is about 4 bit periods Signal "BIO", which is derived from "info decoders", to be described in greater detail below, goes low when the input equals INFO 0. If INFO 0 is detected, then $V_{ath+}$ (the same for $V_{ath-}$, but opposite direction) is ramped down towards the minimum voltage level, i.e. the highest sensitivity.

Figures 6, 7A:
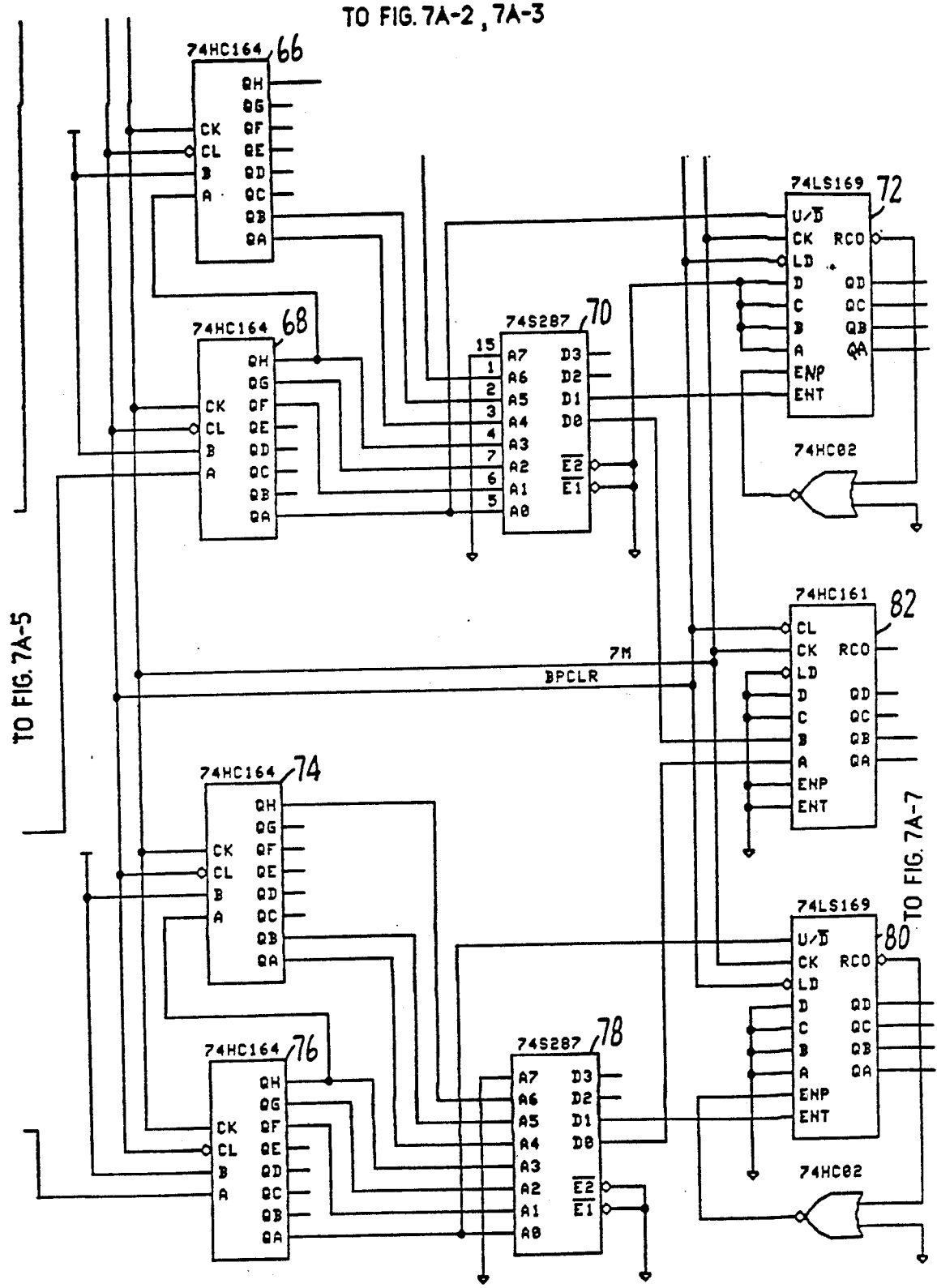
Figures 7, 7A:
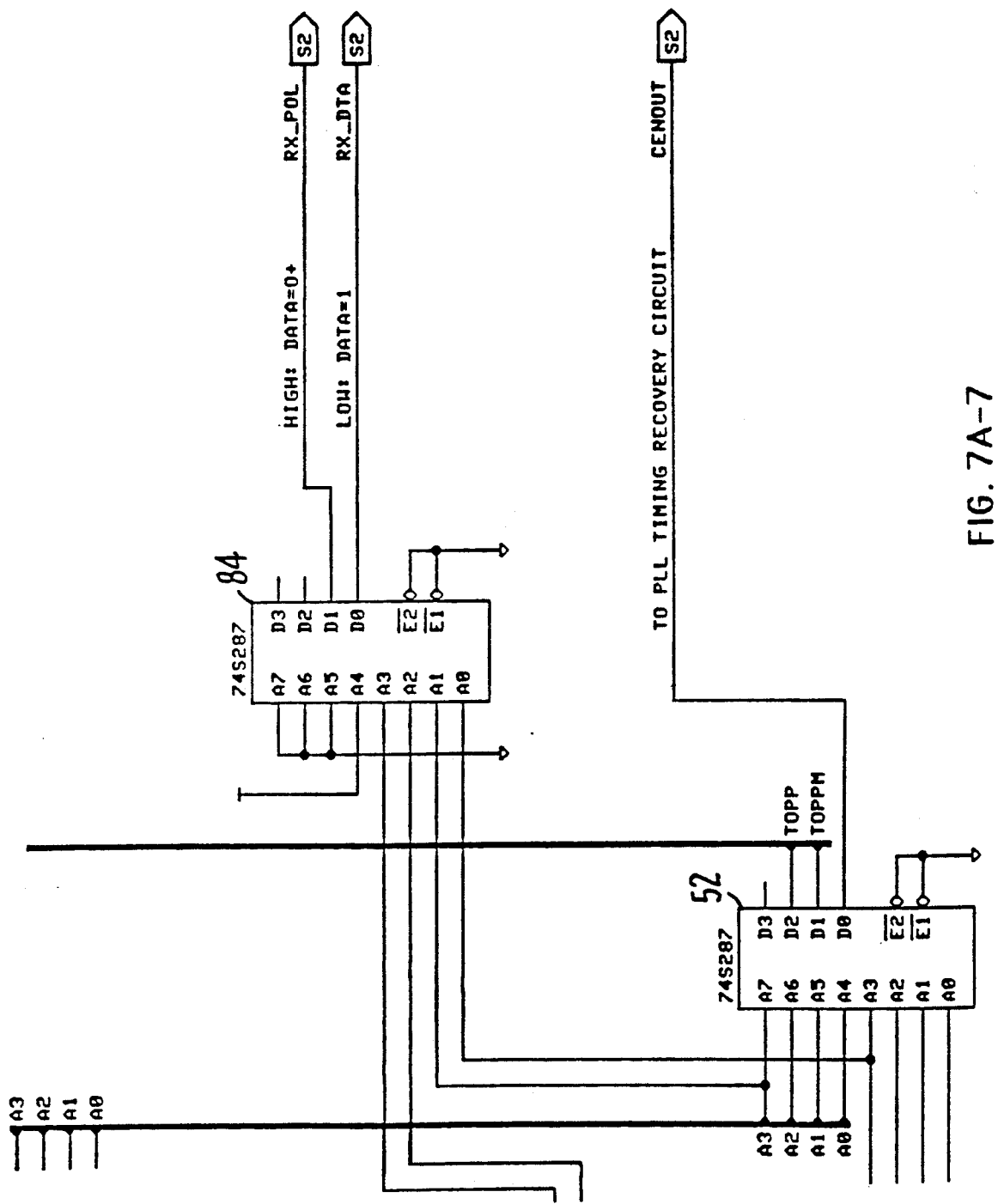

As shown in FIG. 7A-6, the 0+ filter block, consisting of components 66, 68, 70 and 72, and the 0− filter block, consisting of components 74, 76, 78 and 80, are identical. Each filter block consists of two 1-bit wide moving average filters (5 and 15 sampling points), so there are four filters. The filter algorithm sums the numbers of 1's and 0's within the specified window period. If the number of 1's is greater than the number of 0's, then the filter outputs a "1". If the opposite is true, then the filter outputs a "0". Details of the coding algorithm "FTF" are provided in Appendix B at the end of this specification. The implementation of the 15-point filters is slightly different from the 5-point filters, that the 15-point filters utilize counters instead of direct decoding for cost purposes.

The 5-point filters are utilized for signal detection, i.e., demodulation, purposes. The 0+ filter output is available at pin D0 of component 70, while the 0− output is available at pin DO of component 78. These two outputs, after being pipelined through components 82, are provided to PROM 84 (see FIG. 7A-7). PROM 84 also receives inputs from the 15-point outputs of filters 72 and 80. The select pin, i.e., pin A4 of PROM 84, selects either the 5-point pair or the 15-PROM point pair to the outputs of PROM 84. In this embodiment, the select input is connected to $V_{CC}$ such that the 5-point filter outputs are always selected. The "RX-POL" output from PROM 84 is identical to the 5-point filter plus filter output: if high, input=0+; if low, input=0−. The "RX-DATA" output is the logical "OR" of the 5-point 0+ and 0−filter outputs: if high, input equals 0+ or 0−; if low, input equal binary 1. The coding program "FASEL" for the PROM 84 are provided in Appendix C at the end of this specification.

The 15-point filters serve as the front-end circuitry for the center estimator described below. The TOPP and TOPPM signals connected to the auto-thresholder section described above are derived from the 0+ and the 0− filters: if the number of 1's is ≧12 within a 15-point window, then the output is set to 1.

As described above, a front-end set of comparators slice the signal at thresholds determined by a peak detector circuit, typically at one-half of the received signal peak. The system is sampled at a rate $f_s$, typically many times the line-rate $f_b$. Asynchronous polar pulses P and N are fed with proper phase to the filter circuits using shift registers 66, 68 and 74, 76, respectively. Integration is performed by up-down counters 72 and 80 which are connected in a top/bottom self-stop mode. Circuits 70 and 78 produce integrator control signals based in pulse presence for a time span given by the register length. Center estimator ROM 52 contains discrimination logic plus detector circuitry. As stated above, state transition is provided by the FASEL program listing provided in Appendix C.

The center estimator described above is described in greater detail in U.S. Pat. application Ser. No. 108,717 filed by Wong Hee and Jesus Guinea on Oct. 13, 1987, and commonly assigned herewith, now U.S. Pat. No. 4,888,790.

Figures 1, 7B:
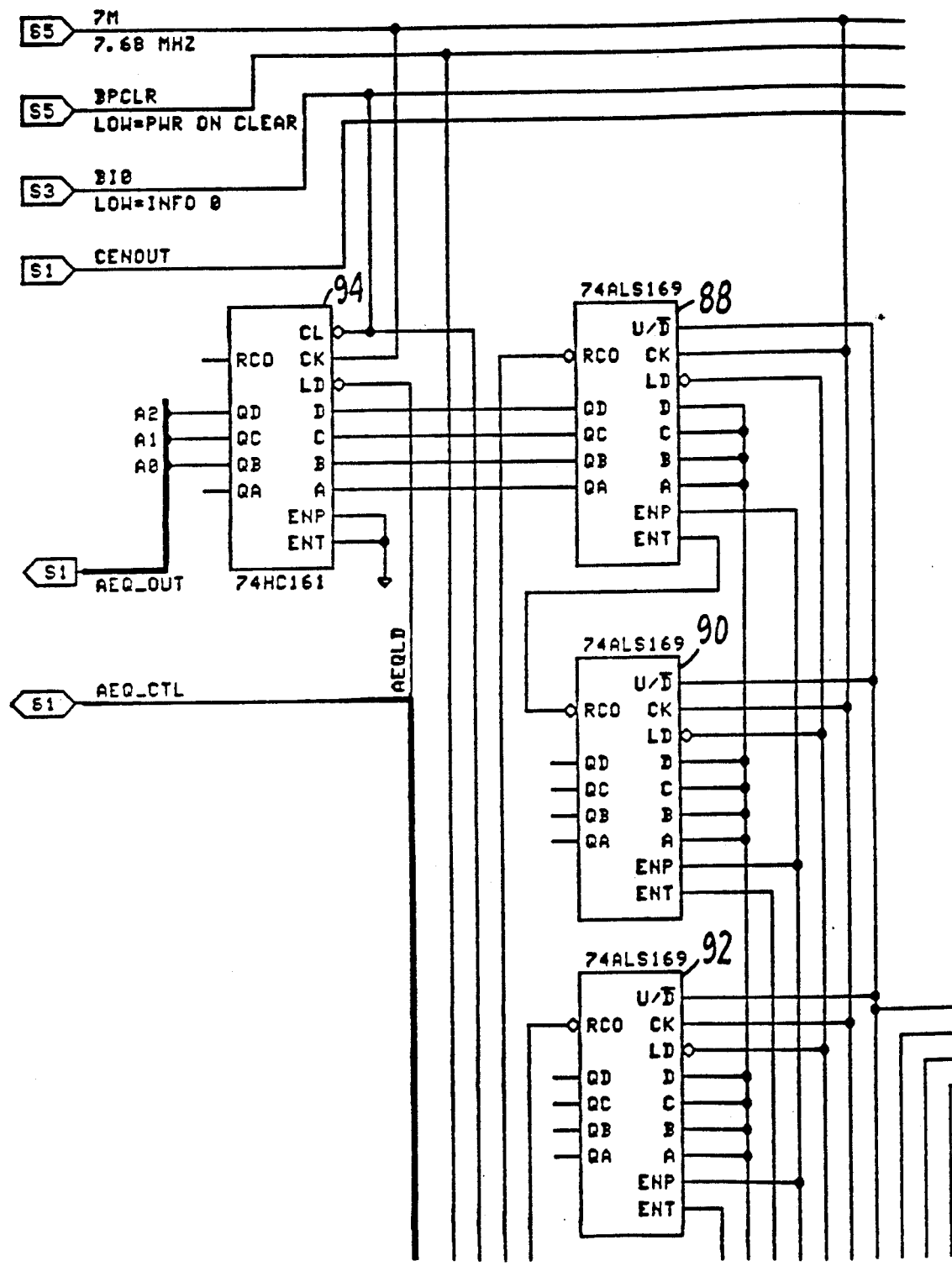
Figures 2, 7B:
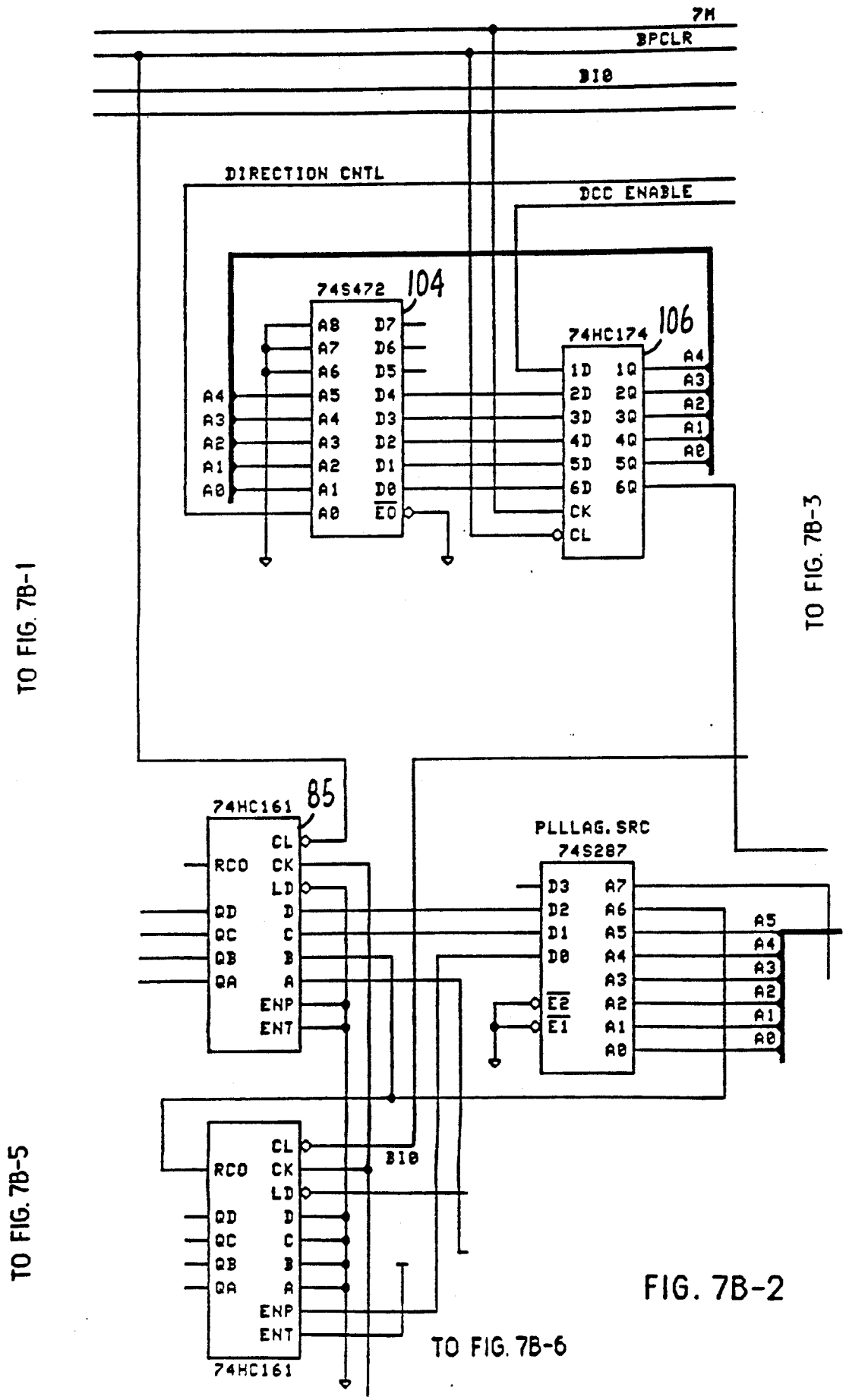
Figures 3, 7B:
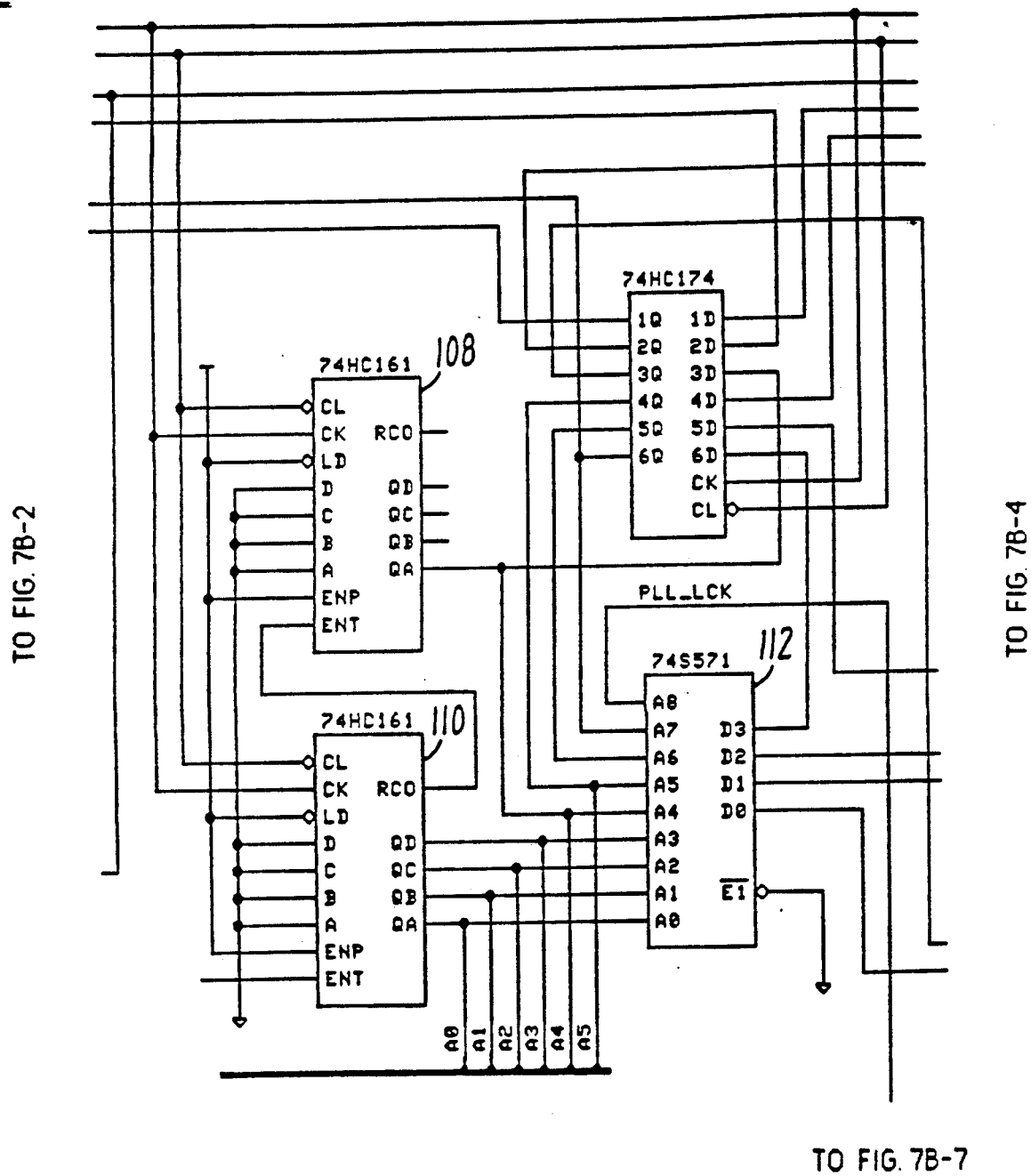
Figures 4, 7B:
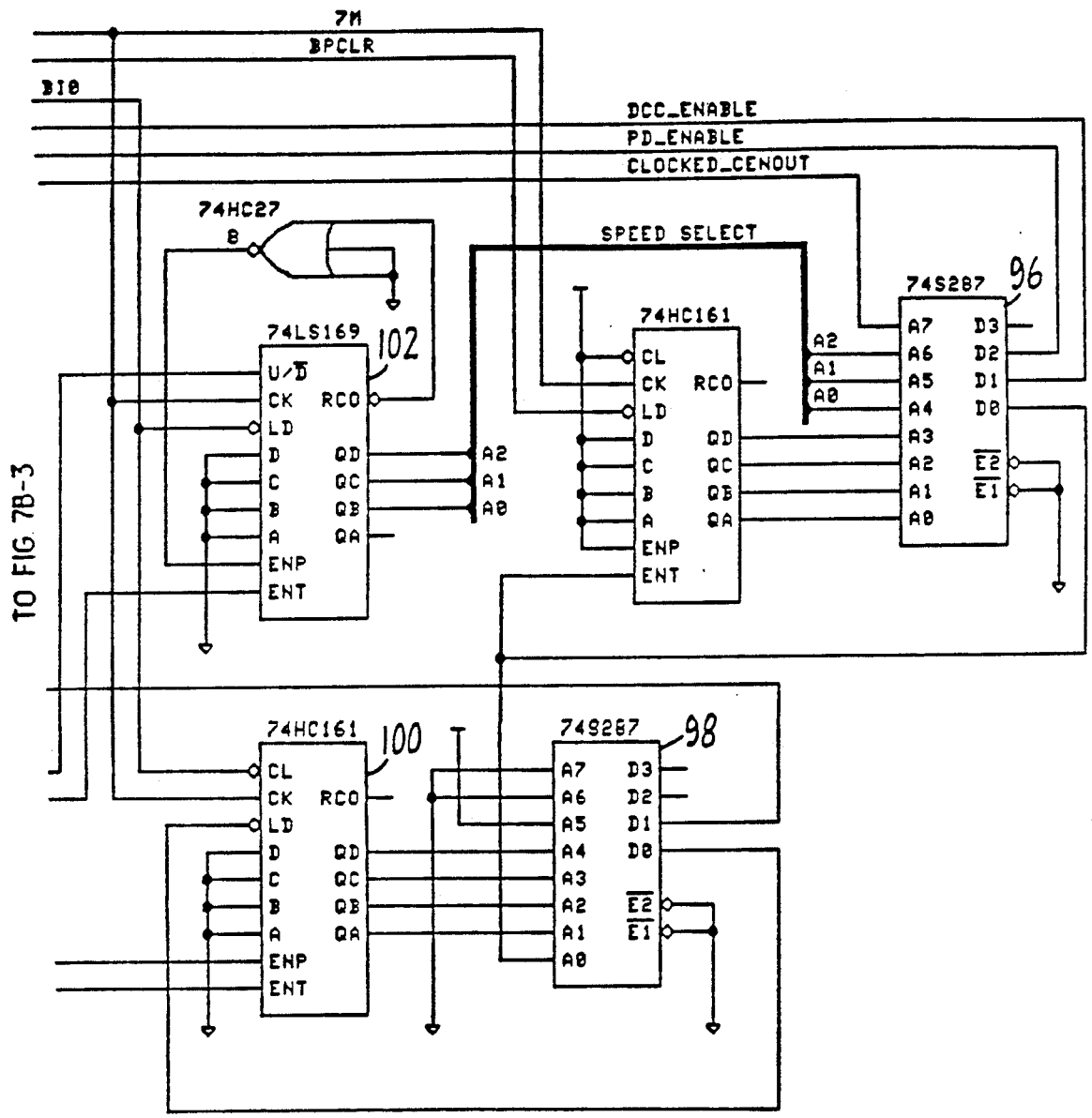
Figures 5, 7B:
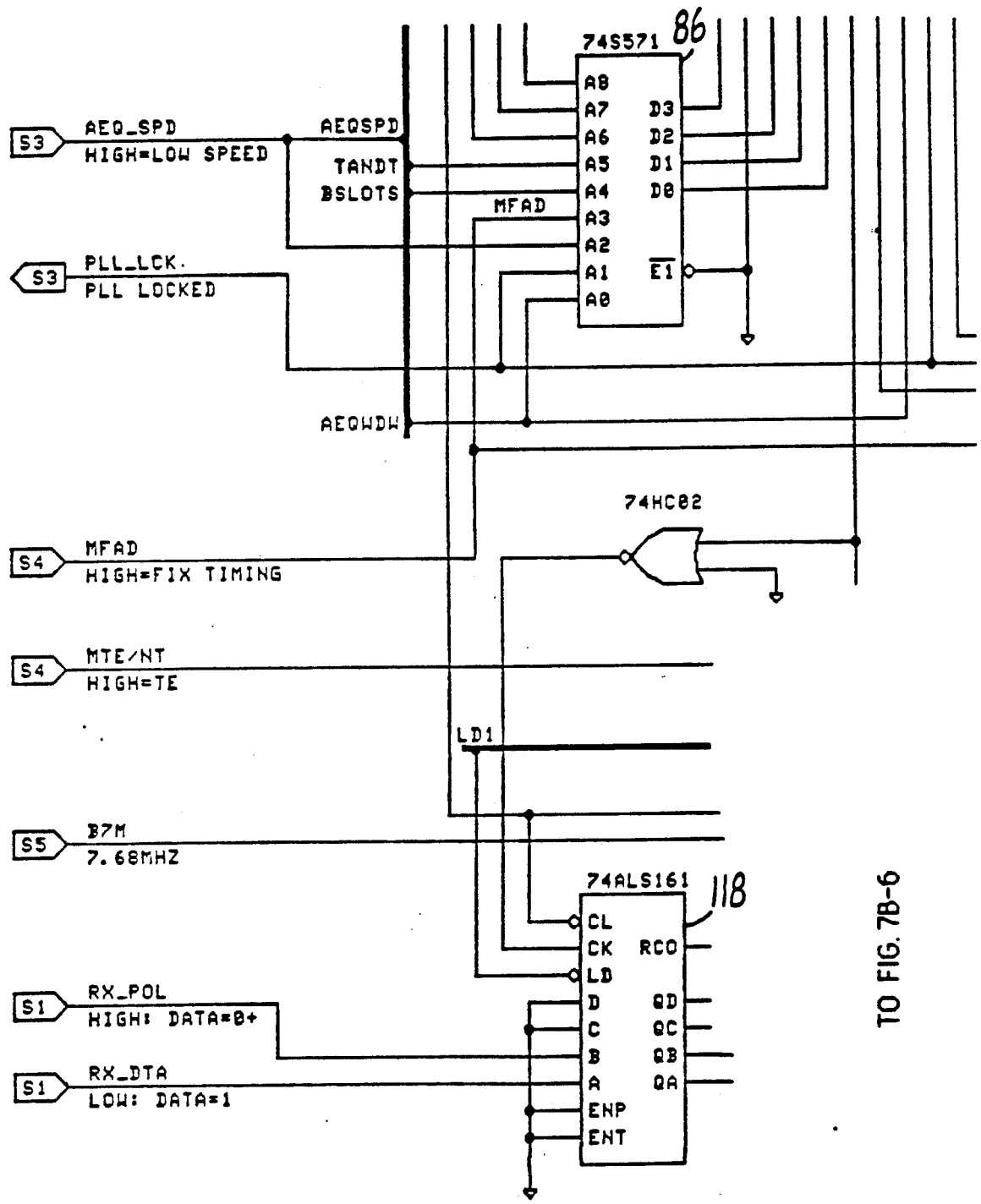
Figures 6, 7B:
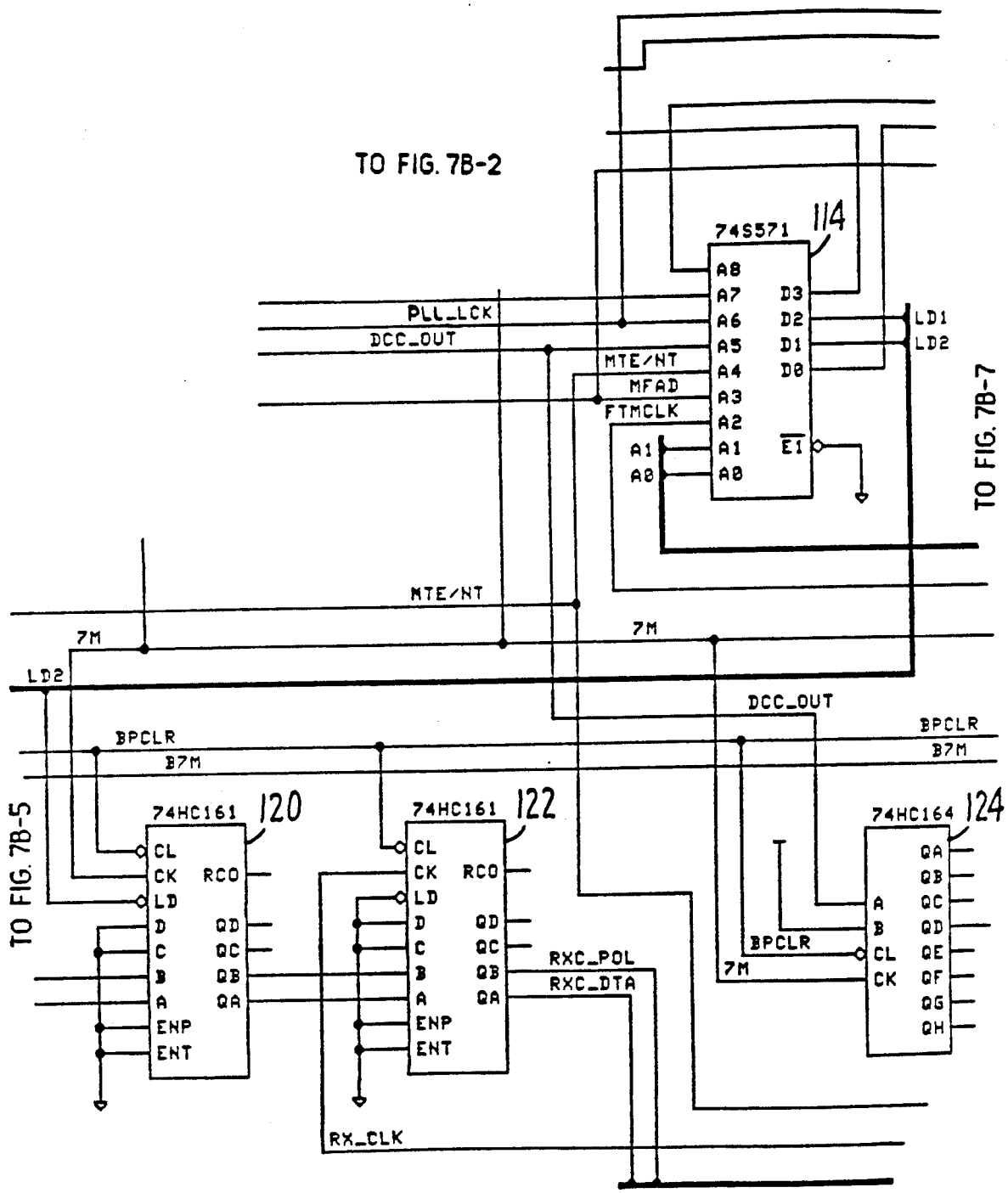
Figures 7, 7B:
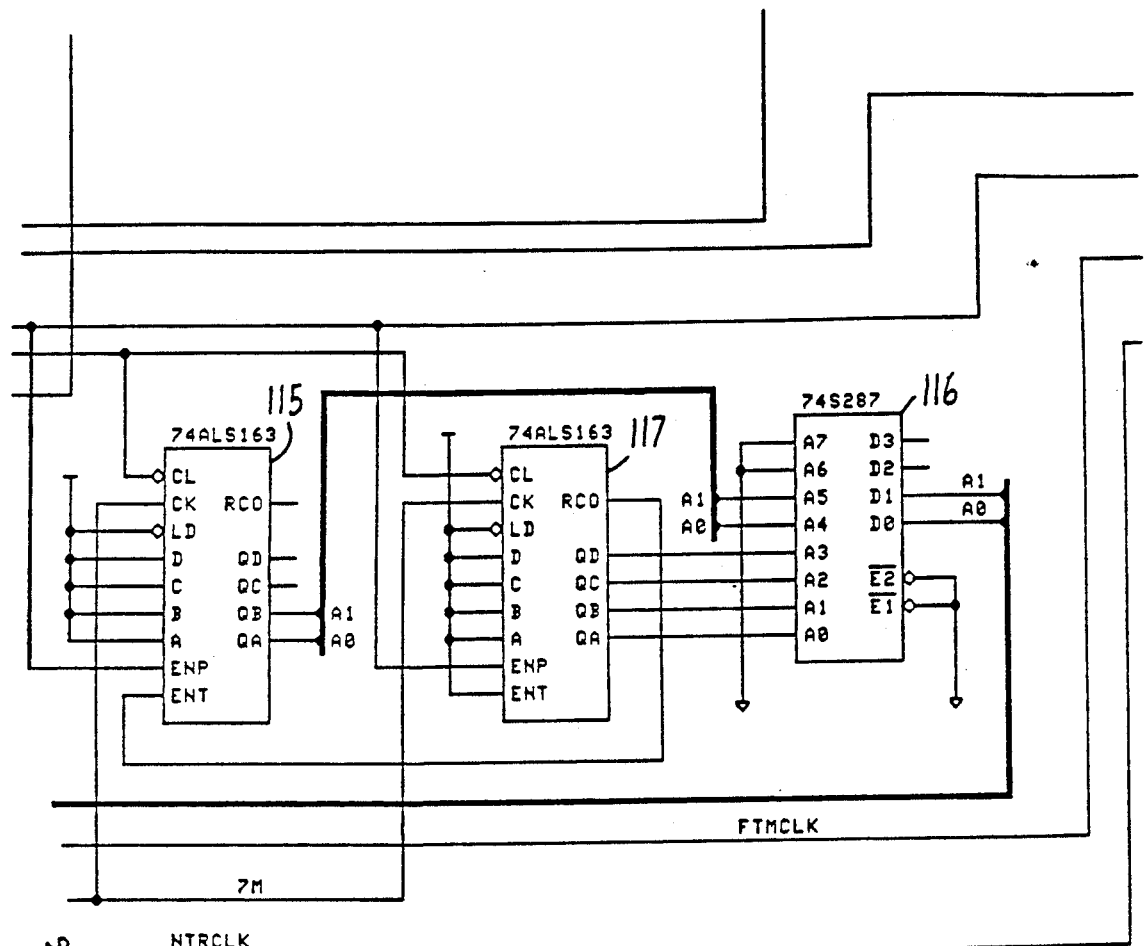
Figures 7, 7B, 8:
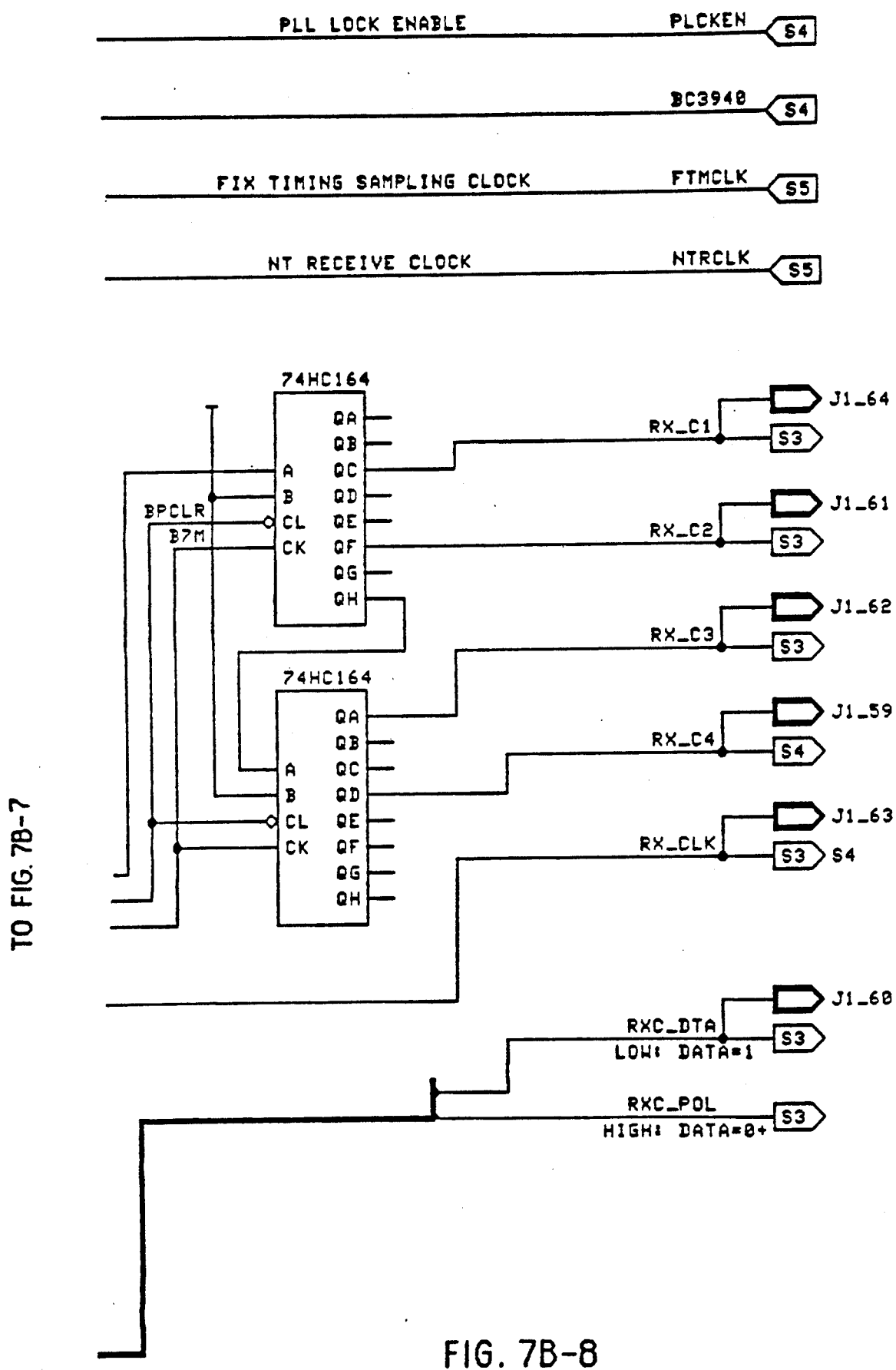

Referring now to FIG. 7B-5, control ROM 86 is in lock with a PLL timing recovery circuit to be described below. The program coding "AEQCTL.src" for equalizer controller ROM 86 is provided in Appendix D at the end of this specification. An auto-threshold circuit should be settled-out, e.g., the slicing level of component 34 tracks the peaks of the equalizer output. The "DCC-OUT" signal controls the up/down of the error integrator counters 88, 90, 92 (see FIG. 7B-1). The DCC-OUT digital-controlled-clock output also equals the timing-recovery clock from the PLL or PLL clock available at pin QD of component 85 (see FIG. 7B-2); low to high transitions are normally aligned to the center of the TOPP signal if the input needs no equalization, e.g., short connection between TE and NT.

The counters 88, 90, 92 are enabled when the "TANDT" signal is high. This signal is available by ANDing the TOPP and TOPPM signals. If the auto-threshold circuit is not settled, the TANDT signal will have either no output or a full output such that there will be no up or down counts passed on to the counters. In the case of no output, the counters are not enabled. In the case of a full output, the up counts will be equal to the down counts since the DCC-OUT signal is centered about the enable window TANDT. In other words, the adaptive equalizer is automatically disabled when the threshold is not settled.

If the RX input is well equalized, the TOPP signal will be centering at the PLL clock rising edges so that up counts equal down counts and no step changes are passed onto component 19 (FIG. 7A-1).

Counters 88, 90 and 92 form a dual speed (8 or 12-bit) error integrator. The integrator has a high tracking-rate when the circuit starts receiving signal, after the reset due to the INFO 0 signal, and a low tracking-rate after "frame in-lock" plus 8 good frames. The selection is controlled by the "AEQSPD" signal derived from the frame synchronizer/lock detector. During the low-speed mode, the AEQWDW and BSLOTS signals are enabled. The AEQWDE signal is available at pin AO of component 86 (see FIG. 7B-5) and is derived from the PLL clock, with a width of window equal to 25% of a bit period, with centering at PLL clock rising-edges.

The BSLOTS signal is available at pin A4 of component 86. 1

If the RX input equals INFO 0, i.e., the BIO signal is low, then the equalizer is reset to flat gain, i.e., no equalization. If in NT fixed timing mode, then the equalizer is disabled, i.e., there is no equalization. Component 94 is a step-update D-latch which is clocked after low-to-high transitions of the TOPP signal so that distortion at the equalizer output due to injection charge of component 19 during step changes is forced to the center of 0+ bit cells. Otherwise, detection errors are caused.

The quotient algorithm digital phase-locked-loop portion of the circuit receives the timing signal strobe and the BIO signal as inputs. A binary phase detector with hold-go gating is implemented by using a function of the strobe (F-strobe) to latch a counter that is cycling through a baud. F-strobe is processed by control machine 96 (see FIG. 7B-4) which avoids correction for a no-strobe condition. Components 98 and 100 are no-strobe time-out circuits.

Speed value is calculated on a saturating (bi-direction) speed counter 102 and altered only when triggered by a strobe on a baud period enabled by the BIO signal. Speed is input to ROM 96 to generate the hold/go signal on a fast or slow basis to feed the digital-controlled-clock. The speed value is fed into the F-strobe monitor which creates a gating signal to the digital-controlled-clock allowing incremental phase to be executed for "x" number of times dependent on the speed.

Referring to FIG. 7B-2, digital-controlled-clock 104 and latch 106 obtain the quotient digital-controlled-clock and output $Q_I$ which gates the SCLK signal to result in RCLOCK. The RCLOCK signal is divided by divider 108, 110 to quantify the phase position on a baud interval (baud rate recovered clock) for the binary phase-detector using the most significant bits and the range-phase- detector circuit using a magnitude-of-phase-error comparator. As stated above, the software generation state for the sequential machines in ROM 96 ("PLLCTL.src"), 112 ("BRPD.src"), ROM 98 ("NOSTB.src") and ROM 104 ("DCC.src") are shown in appendices E, F, G and H, respectively, at the end of this specification.

The No-strobe decoder 98, 100 used in this portion of the circuit increases the phase-locked-loop gain when seven consecutive missing synchronizing-strobes to the PLL are detected. Otherwise, the PLL would not be able to track an input with excess frequency-offset. The extreme case would be info 3 or 4 without marks at the B, D and SF channels.

The quotient algorithm digital phase-locked-loop described above is described in U.S. Pat. application Ser. No. 108,371 filed by Wong Hee and Jesus GUinea on Oct. 14, 1987, and commonly assigned herewith, now U.S. Pat. No. 4,862,485 utilizes ROMs 114 and 116, the coding algorithms for which "SCLKP.src" and "SCPDEC.src" are provided in Appendices I and J, respectively, at the end of this specification.

In the TE mode, the first sampler clock, i.e., pins LD and CK of component 118 (see FIG. 7B-5), experience a 0.5 pipeline delay after the PLL clock. Thus, the "Signal Eye" at the filter output is sampled at maximum "eye" opening. The second-sampler clock, i.e., pins LD and CK of component 120 (see FIG. 7B-6), experience 1 pipeline delay after the PLL clock, allowing data to be passed onto the third sampler. The third sampler clock, i.e., pin CK of component 122, experiences a 4.5 pipeline delay after the PLL clock. Since this clock is also used for the TX bit clock, the delay section, i.e., the tap point at component 124, will effect the alignment of the TX zero-crossings to the RX zero-crossings. An offset of 3-4% TX zero-crossings lagging the RX crossings, In the NT adaptive timing mode, the first sampler clock, i.e., pins LD and CK of component 118, experience a 0.5 pipeline delay after the PLL clock. Thus, the "Signal Eye" at the filter output is sampled at maximum opening. The second sampler clock, i.e., pins LD and CK of component 120, as derived from a free-running counter with frequency synchronized to the TX bit clock. If the PLL is out-of-lock, the counter is phase synchronized to the PLL clock with rising edges equal 20 pipeline delay (half of a bit period) after rising edges of the PLL clock. If the PLL is in-lock, the synchronizing link to the PLL is defeated and the counter left free-running and the frequency is synchronized to TX bit clock. Thus, it samples at maximum opening of the signal I for the first sampler 118. The third sampler is clock 122. Therefore, the received data output has the same timing as the transmitter.

In the NT fixed timing mode, the first sampler clock 118 has a 0.5 pipeline delay after the fixed timing clock, i.e., pin A2 of component 114, i.e., a fixed relationship to the TX bit clock. A second sampler clock 120 experiences a 1 pipeline delay after the fixed timing clock to allow data to pass onto the third sampler. The third sampler clock 122 is connected to the TX bit clock so that the receive data output has the same timing as the transmitter.

Figures 1, 7C:
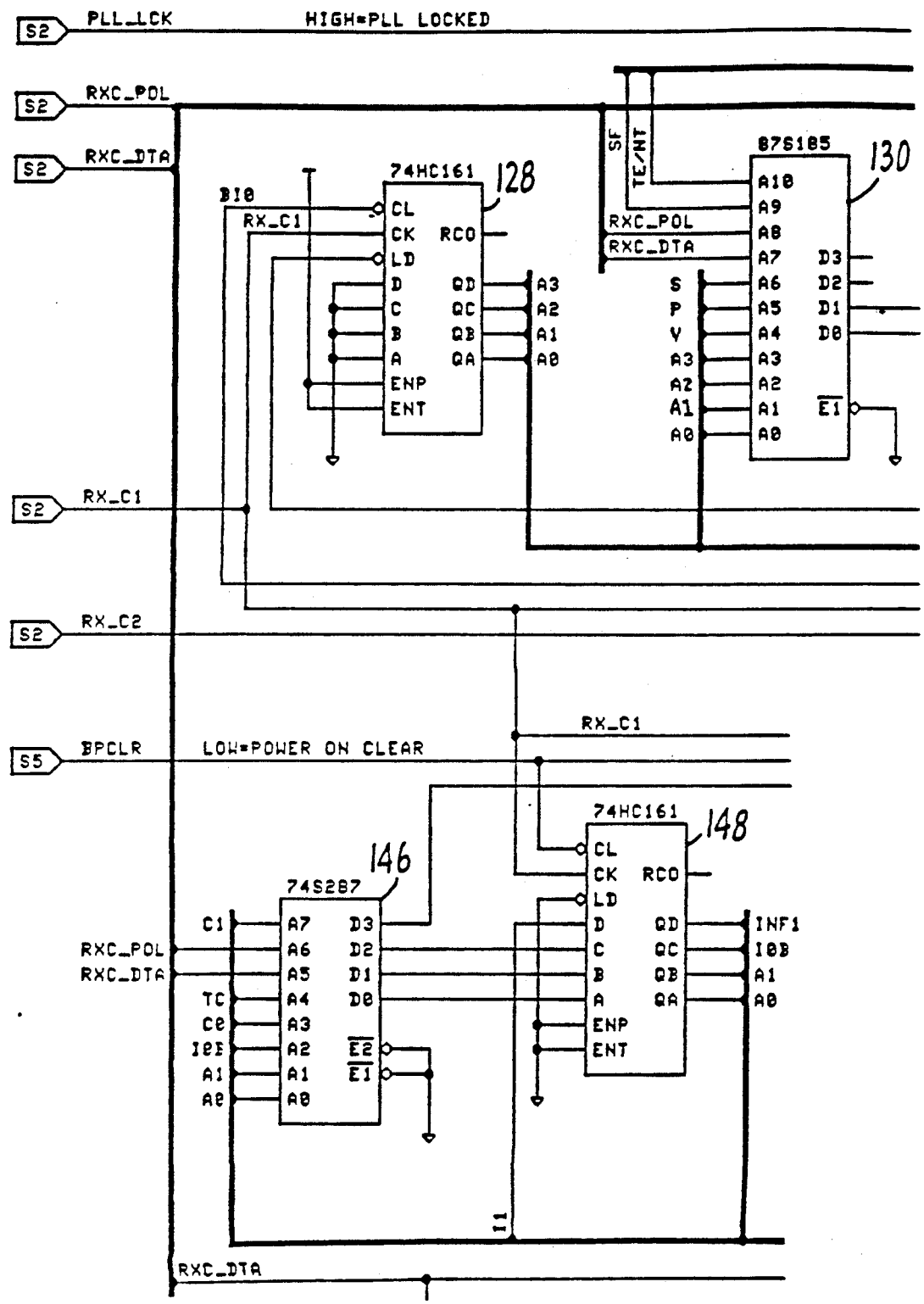
Figures 2, 7C:
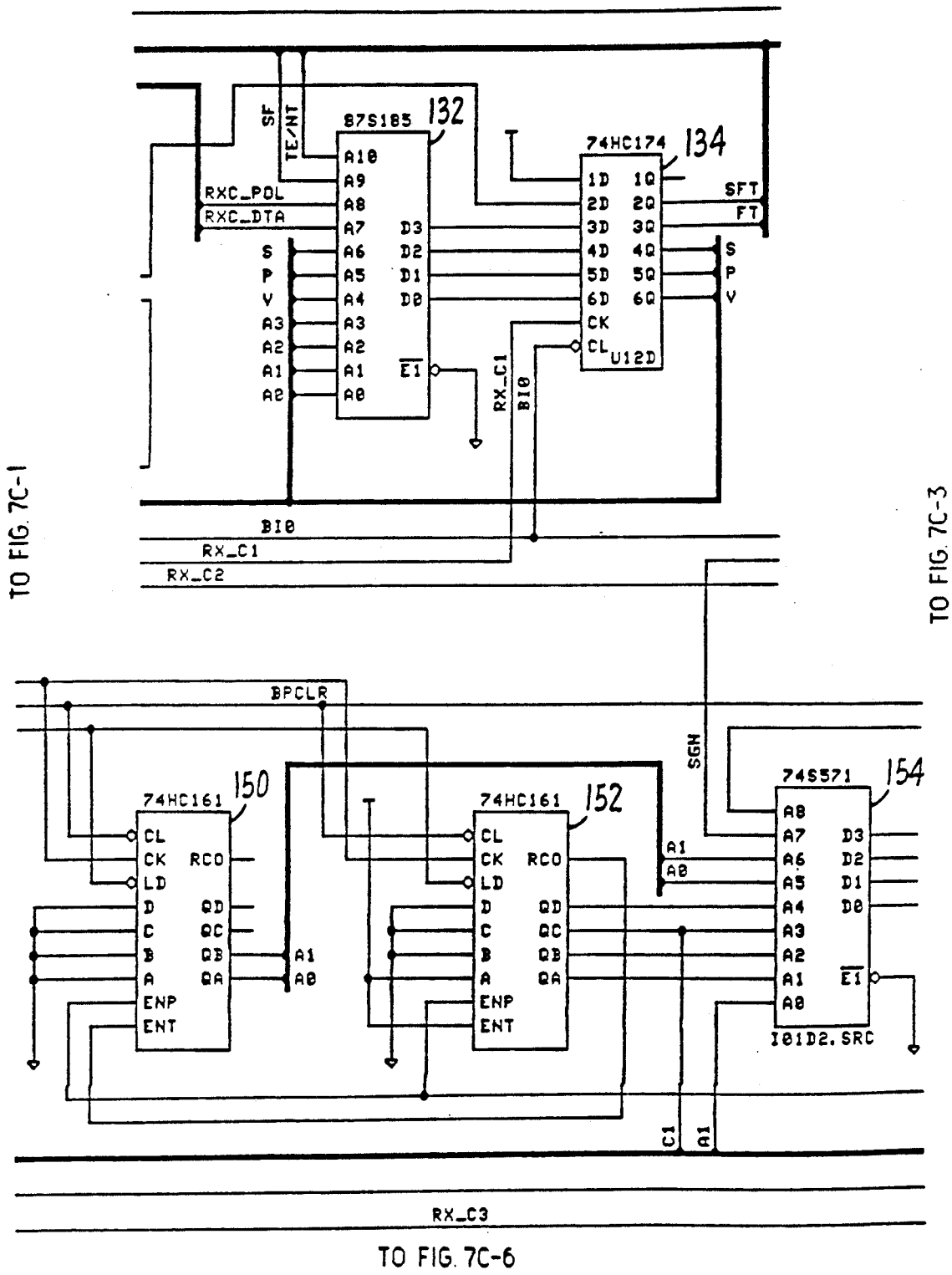
Figure 7C:
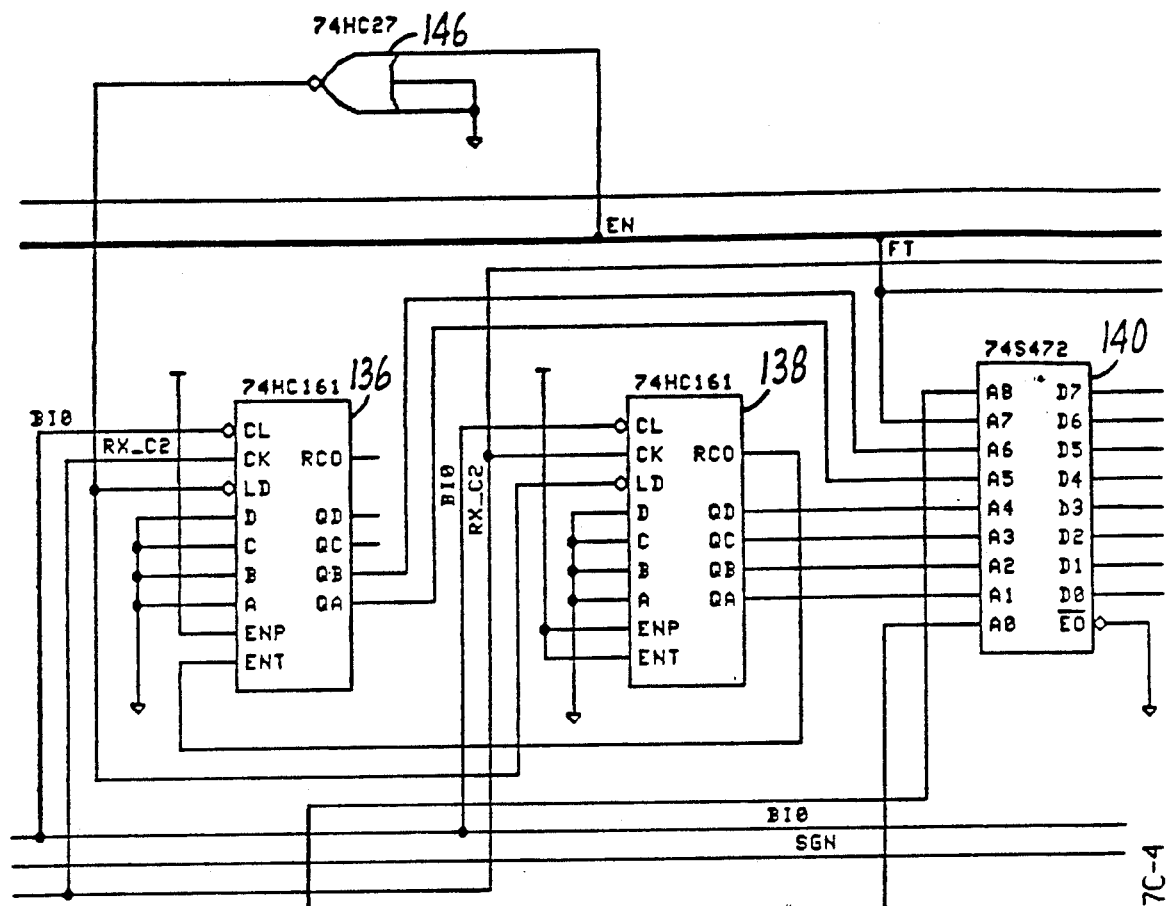
Figure 3:
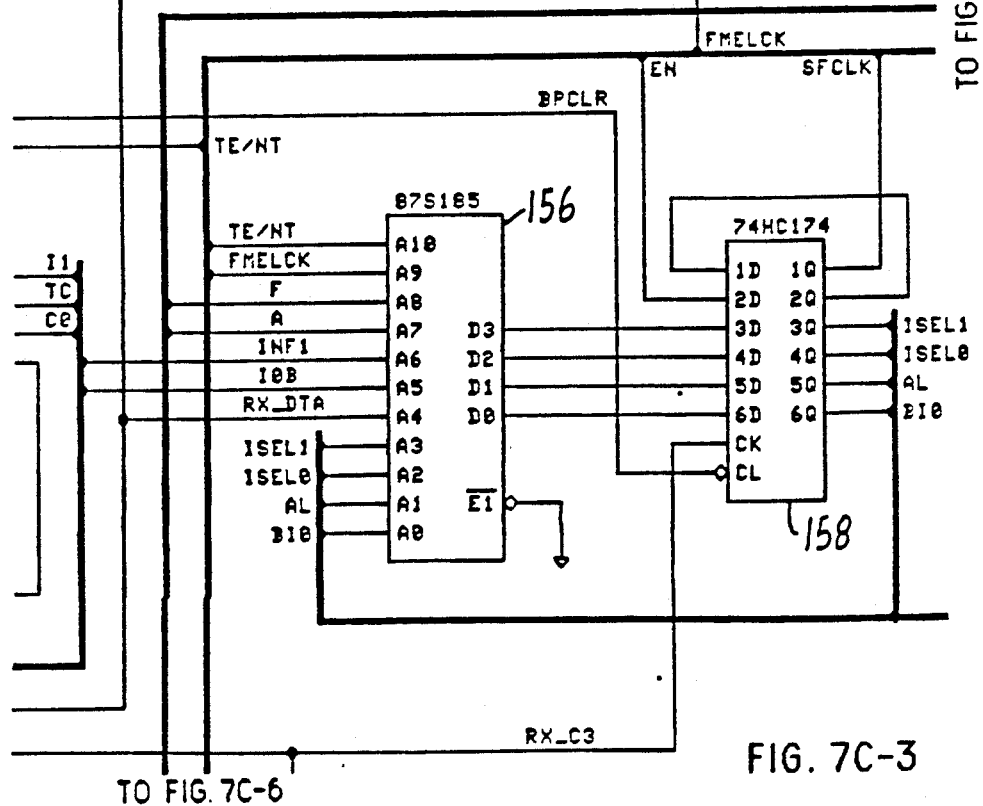
Figures 4, 7C:
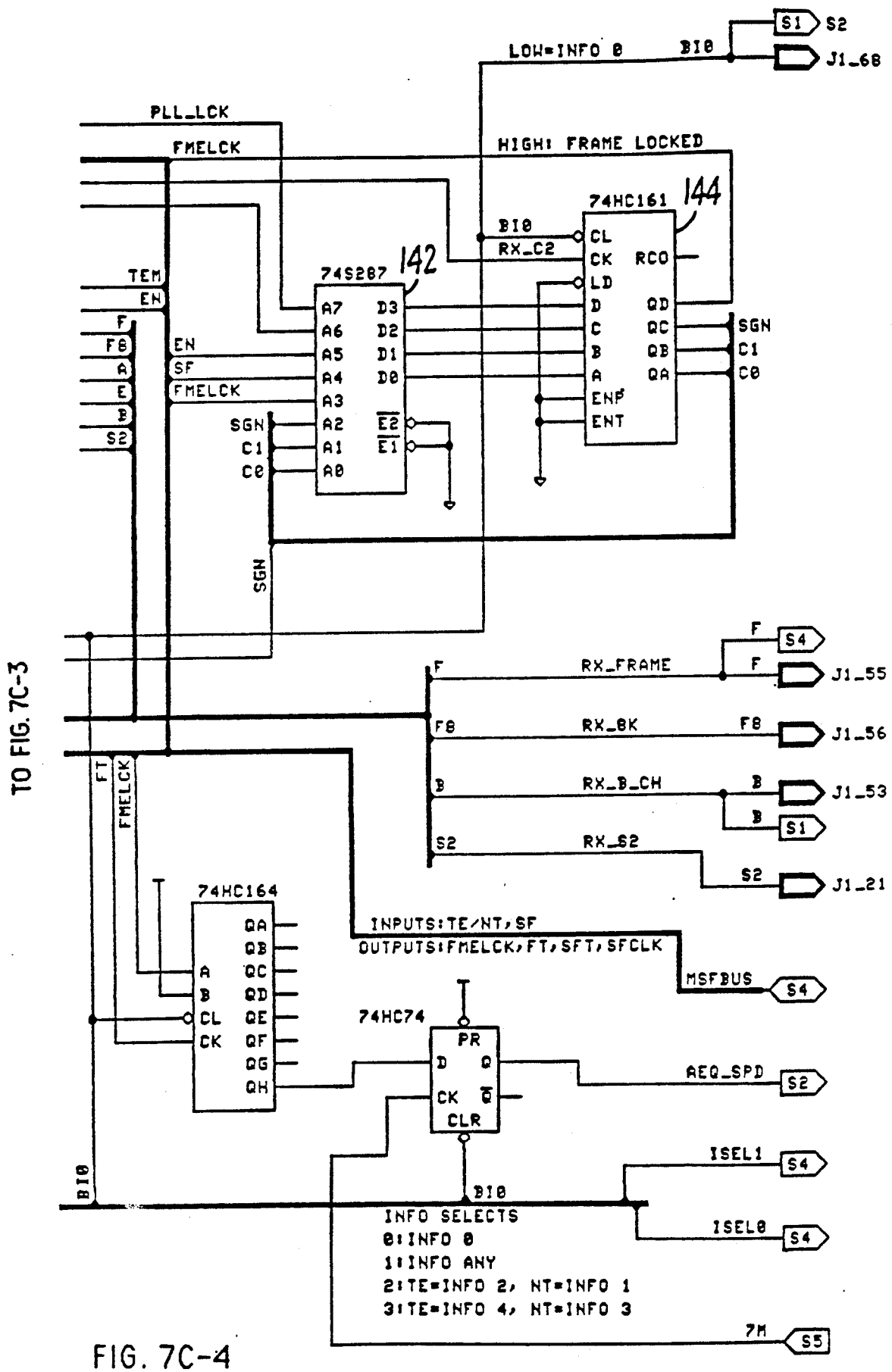
Figures 5, 7C:
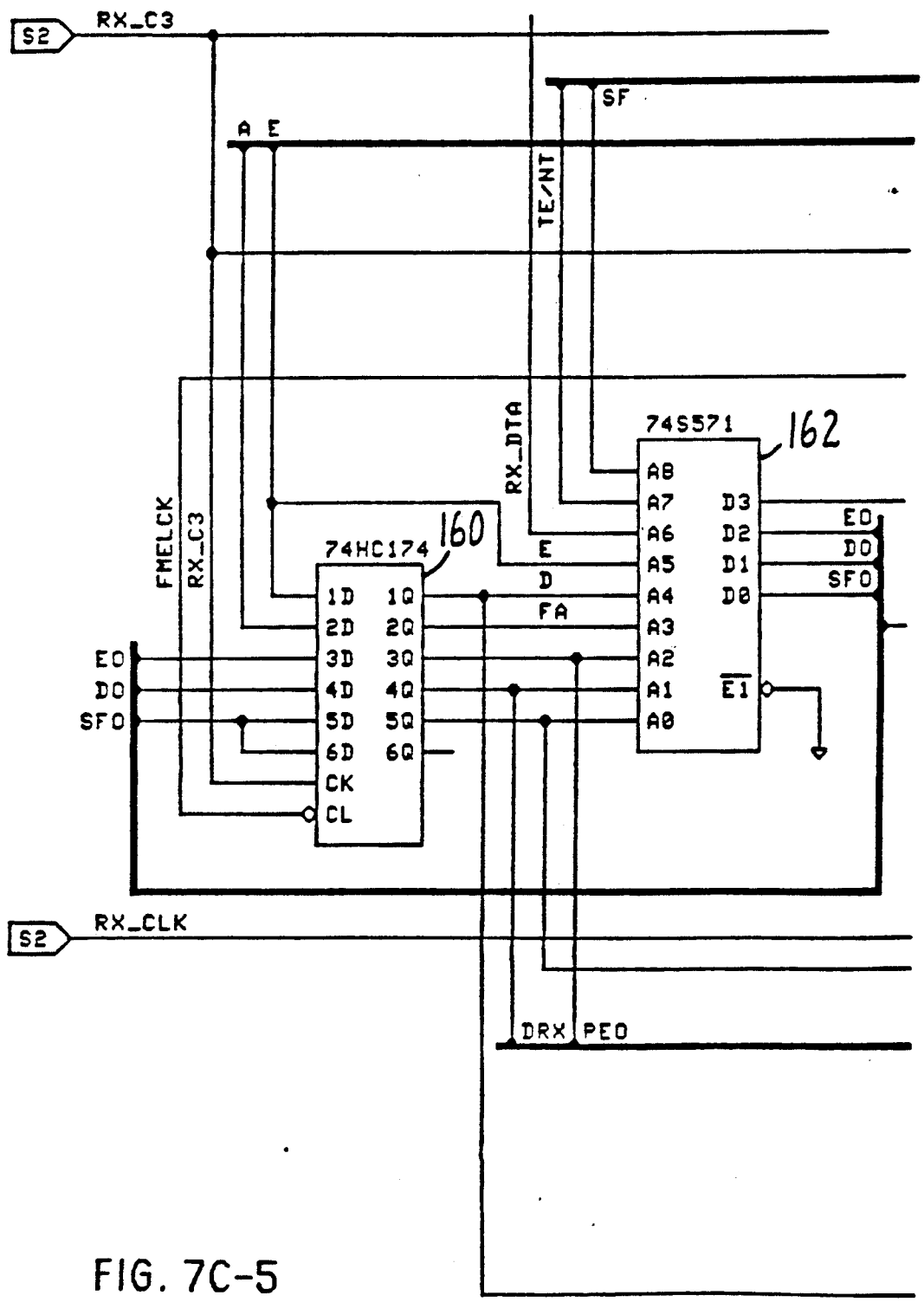
Figures 6, 7C:
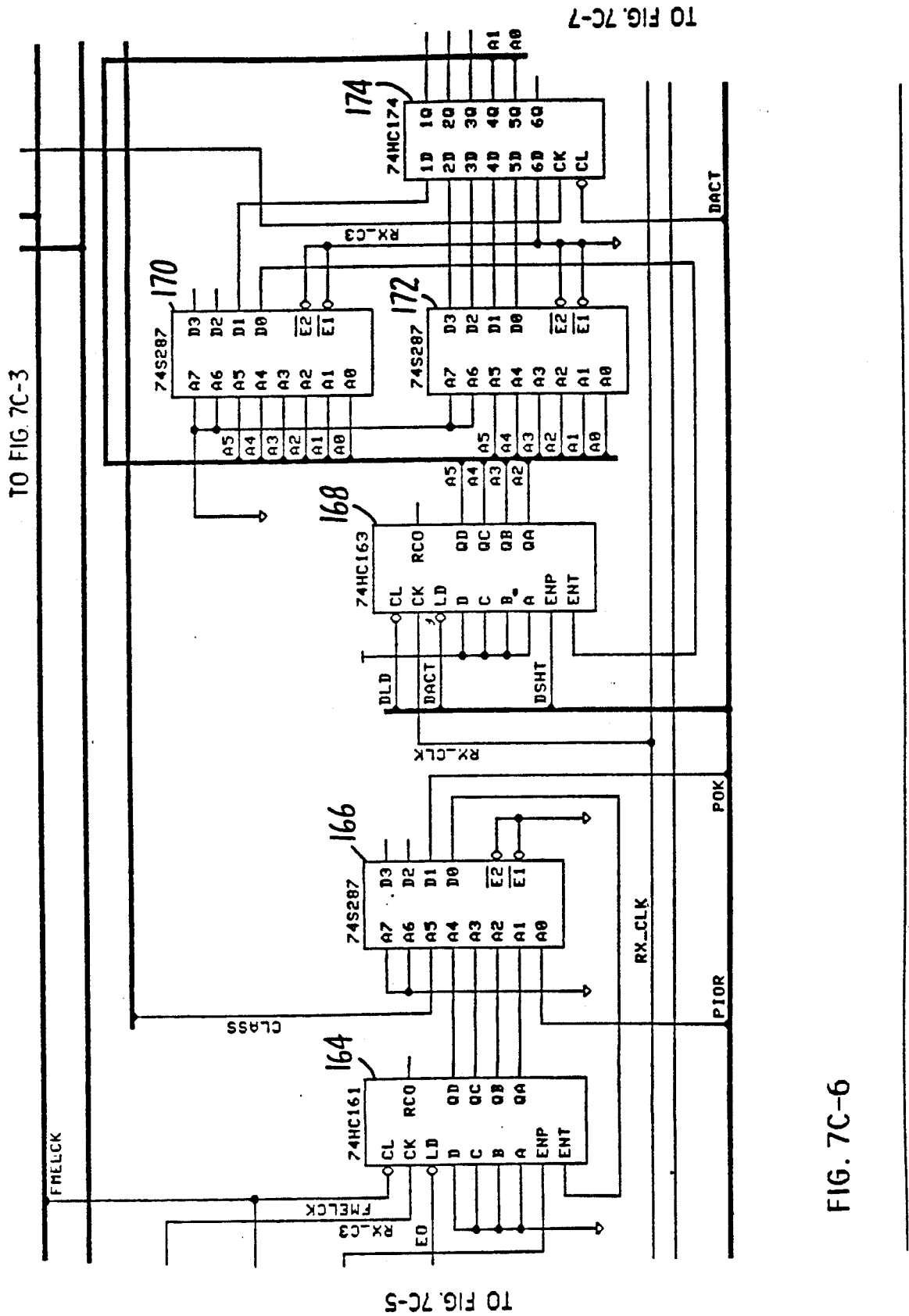
Figures 7, 7C:
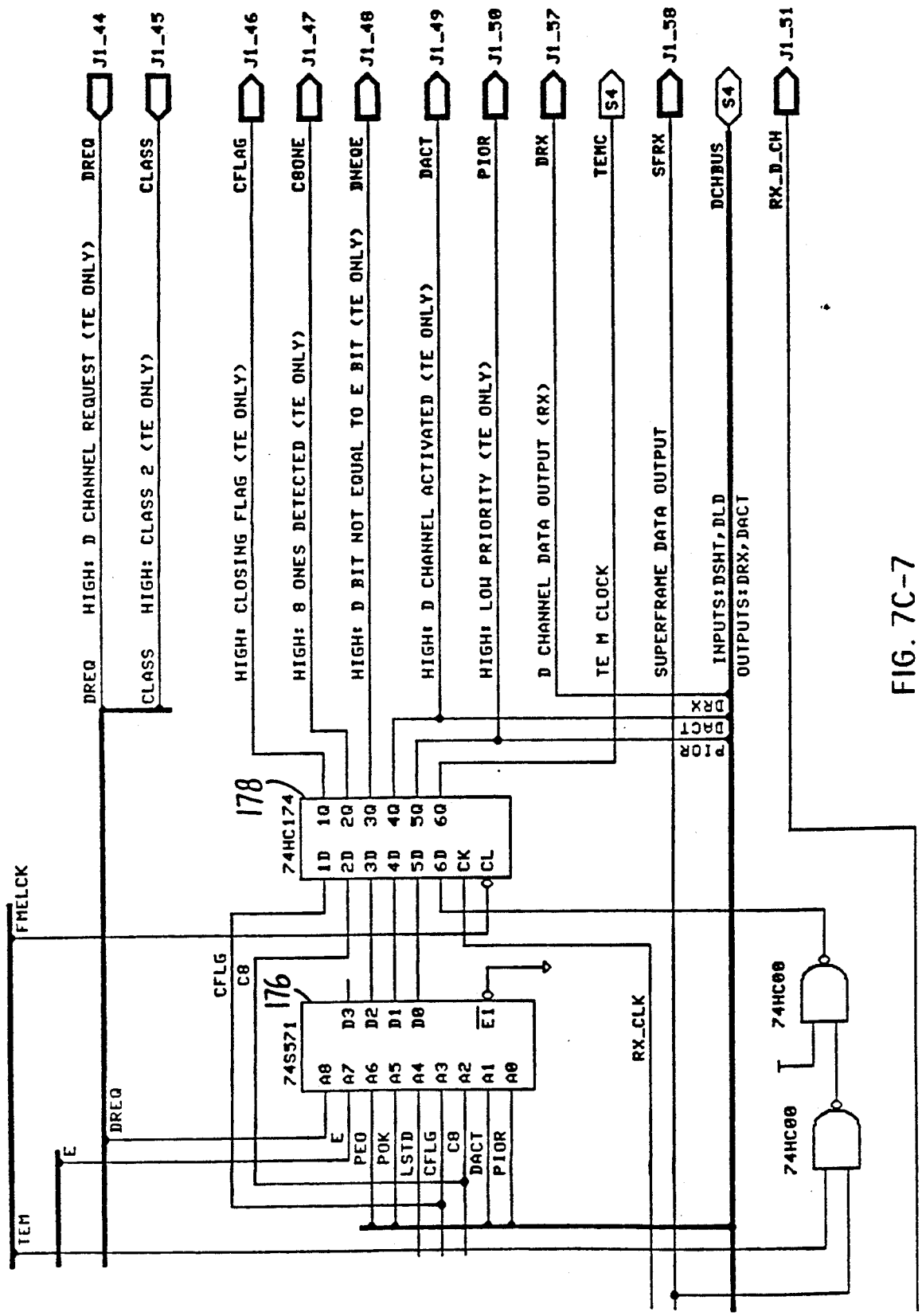

Referring to FIGS. 7C-1 and 7C-2, components 128, 130, 132 and 134 form a frame trigger pulse decoder.

As shown in FIGS. 7C-3 and 7C-4, components 136, 138, 140, 142, 144 and 146 form a frame synchronizer/-lock detector. Three consecutive good frames plus the PLL inlock equals a frame in-lock. Three consecutive BAD frames equal a frame out-of-lock. If the input equals INFO 0 (BIO=low, then the frame is cut-of-lock). The $R_x$ bit id outputs are as follows:

B1 channel: B (pin D1 of component 140)=high F8 (pin D4 of component 140)=high
B2 channel: B (pin D4 of component 140)=high F8 (pin D4 of component 140)=low
S2 channel: S2 (pin D0 of component 140)=high
D channel: Decoded as described below
SF channel: Decoded as described below
Note: F8 also provides half-frame timing PROM 140 (see FIG. 7C-3) also decodes the polarity of the M bits (super frame) for generating the M clock in the TE mode.

Referring to FIGS. 7C-1, 7C-2 and 7C-3, components 146, 148, 150, 152, 154, 156 and 158 combine to f©rm info decoders. The info recognition criteria are as follows:

INFO O: If no 0+ or 0− pulses for 64 data bits, BIO (bar info 0) goes low at frame boundaries.
NFQ 1: NT mode, 8 consecutive "0011xxxx" frame received, "x" denotes either 0 or 1, the two consecutive Os must be opposite in polarity and consistent through the 8 frames.
INFO ANY: Circuit detects Info Any after receiving two opposite "0" pulses (¢0+, 0−" or "0−, 0+"). If other info types can be unambiguously recognized the detector will flag the actual info types instead. Normally, info Any indicates the receiving of 12, 13 or 14 when the framing circuit is not in-lock, i.e., loss of framing or before locking.

INFO 3: NT mode, frame in-lock
INFO 2: TE mode, frame in-lock, "A" bit=binary 0 (0+ or 0−)
INFO 4: TE mode, frame in-clock, "A" bit=binary 1

A D-channel access/E-channel logic circuit is formed by components 160, 162, 164, 166, 168, 170, 172, 174, 176 and 178 (see FIGS. 7C-5, 7C-6 and 7C-7). Components 160 and 162 area D/E/SF transmit-data decoder. Pins D3 and D2 of component 162 provide the E-bit outputs which control "C" counter 164. Pin 3Q of component 160 is a pipelined E-bit output which drives component 176 for transmission E-bit data input to the transmitter in the NT mode. Pin 5Q of component 160 is the super-frame transmit-data output for NT mode only. In the TE mode, this pin decodes the inverted $F_A/N$ bits from the NT output to qualify the generation of the Mclock. Components 164 and 166 form a "C" counter, with pin D1 of component 166 high if the D-channel is available, i.e., "C" count is ≧ the current priority level. Both the class and the priority signals are inputs to this counter. The circuit is disabled if the frame is out-of-lock. Components 168, 170, 172 and 174 combine to form a D-channel flag-decoder. The LSTD signal or last-transmitted D-bit from the local transmitter, on pin 1Q of component 174 feeds component 176 for error flag generation. If this flag is found true, the D-channel access is terminated immediately, i.e., the DACT signal on pin A1 of component 176 goes low. The transmitter sends binary 1s in the D-channel afterward regardless of the state of the transmitter data input. There are no more DSHT (D-channel data shift-/enable) pulses to the outside world for requesting data. Priority remains the original value, i.e., high priority.

The HDLC Closing flag CFLG at pin 2Q of component 174 goes high after the transmission of "01111110 D......D 01111110" in the D-channel, where "D......D"=any data pattern except HDLC flags. If a continuous seven 1's pattern is embedded in the "D......D" sequence, then the flag "01111110" after the seven 1's pattern is considered to be the opening flag again. Without the seven 1's pattern, this sequence would be the closing flag. The next "01111110", i.e. third flag starting from the beginning of the transmitted message, becomes the actual closing flag. It should be noted that the "0" between two flags can be shared by the two flags: i.e. "0111111101111110" contains an opening flag and a closing flag. After the closing flag, the D-channel is considered to be deactivated. The circuit functions the same way as the deactivation caused by the D<>E error flag except that the priority is set to low priority.

The "C8" signal at pin 3Q of component 174 goes high if D-channel transmitted data was eight consecutive 1's. After this flag, the D-channel access is deactivated. This is similar to the closing flag case except there are no priority changes.

The D-channel request input DREG at pin A8 of component 176, connected to an external microcontroller, goes high if TE wants to access the D-channel. If pin A5 of component 176 is high, i.e. the D-channel is available, and DREQ is high, then DACT is high showing that the D-channel is activated. If any of the error flags (E<>D, CFLG, C8) are detected, then DACT goes low showing that the D-channel is deactivated. Priority output at pin 5Q of component 178 is high (low priority) if deactivation is due to CFLG. If frame is out of lock during activation, then the D-channel access is terminated immediately the same way as caused by other flags. The implementation is achieved by resetting the D-channel circuit, including the C counter, to its power up state. In other words, D-channel access is only possible when the frame synchronizer is in lock.

Figures 1, 7D:
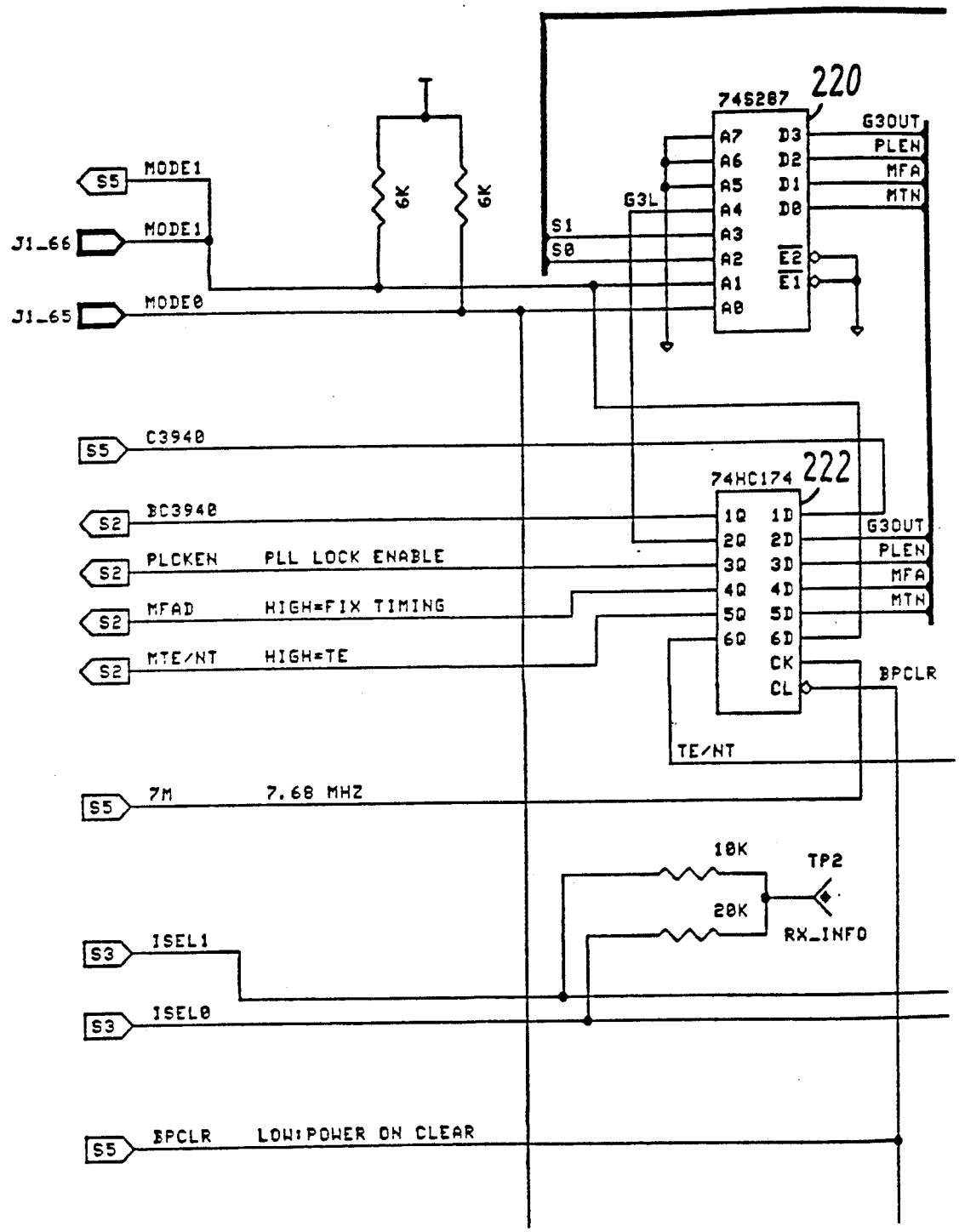
Figures 2, 7D:
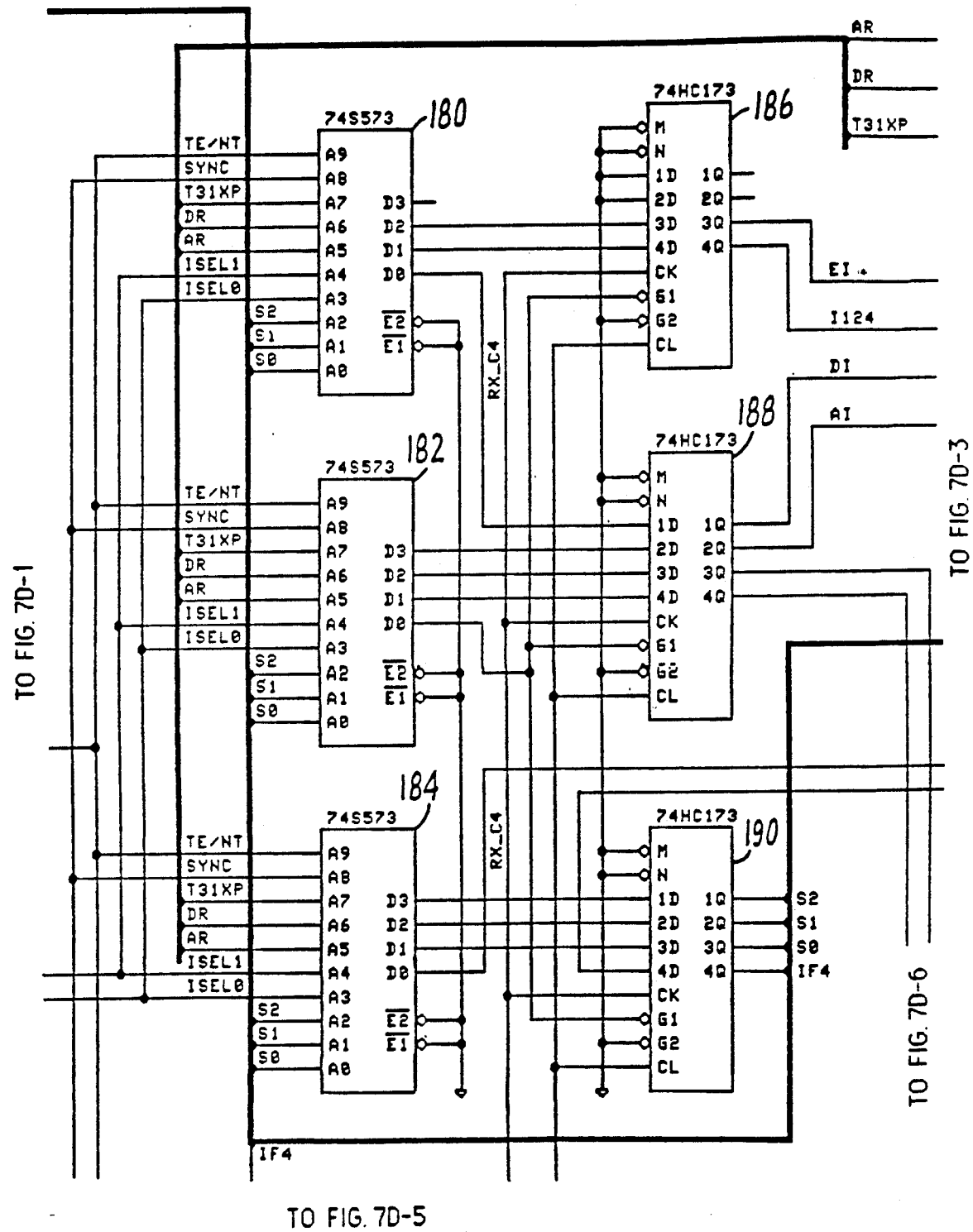
Figures 3, 7D:
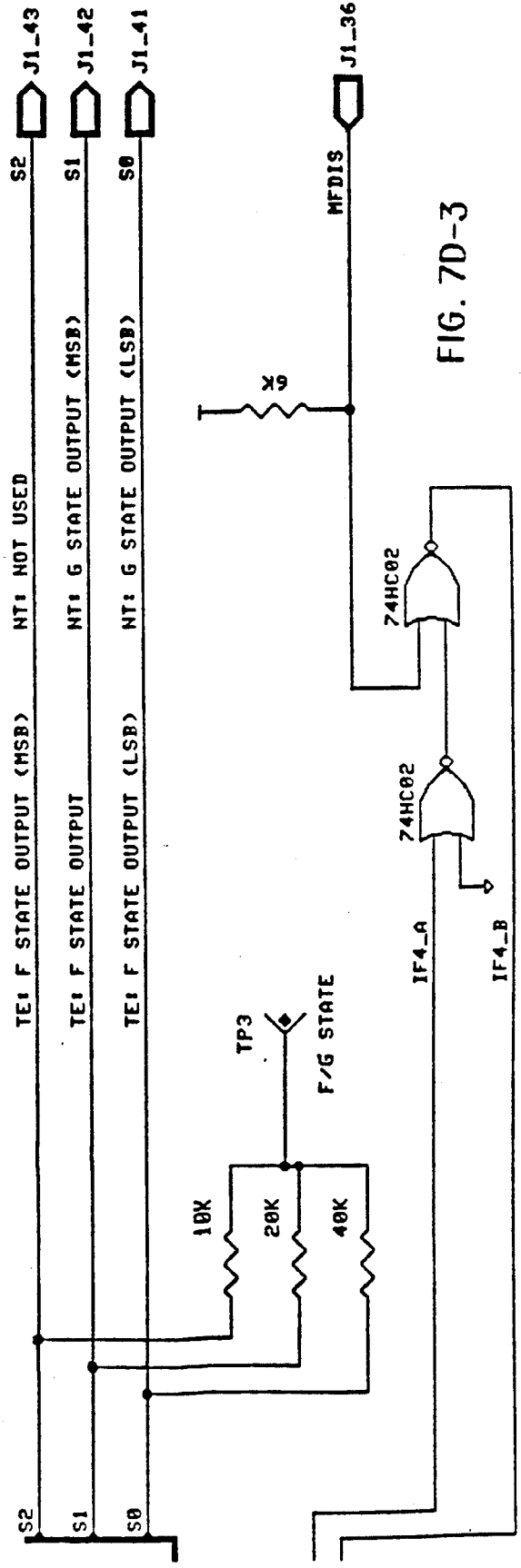
Figures 4, 7D:
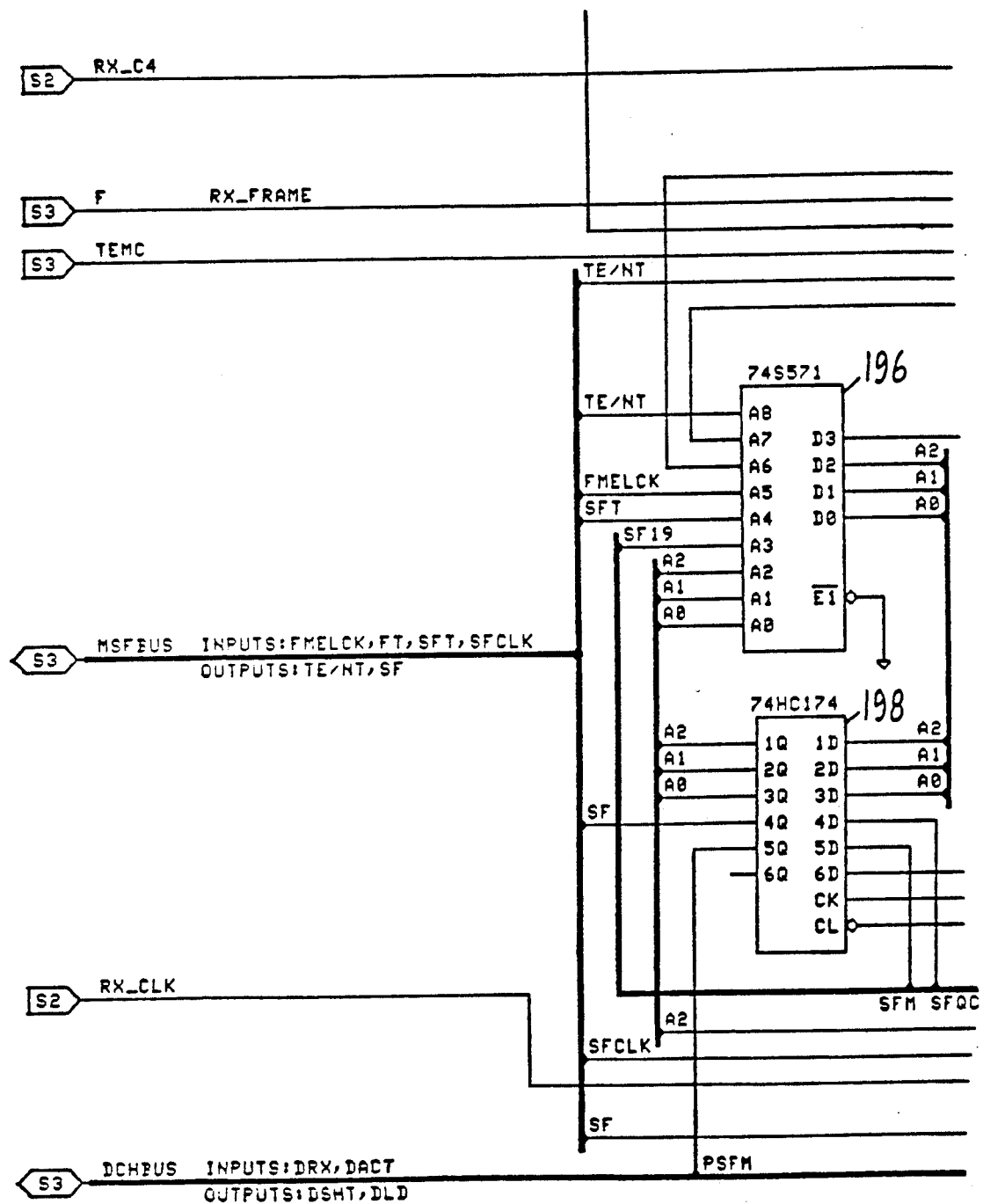
Figures 5, 7D:
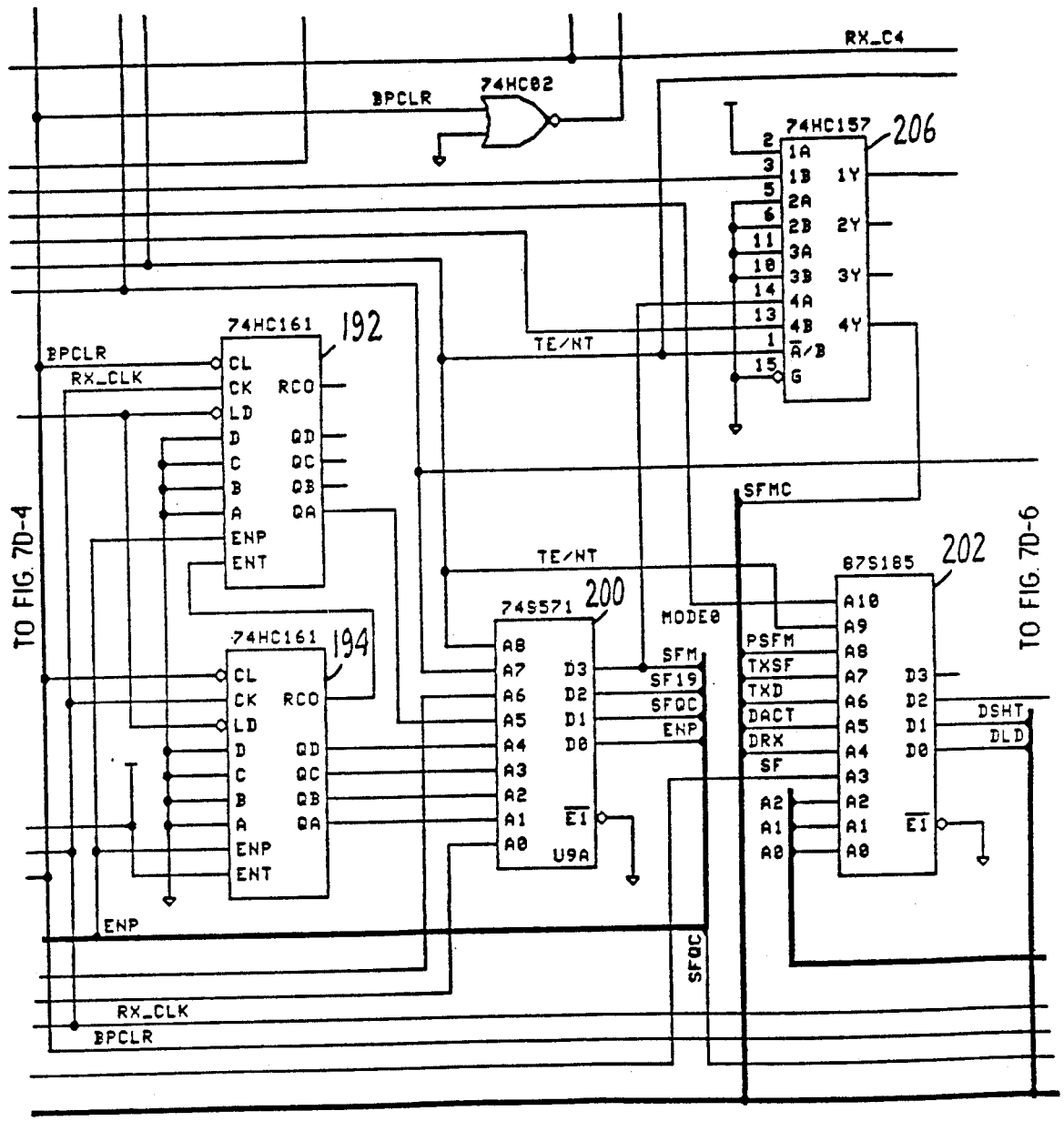
Figures 6, 7D:
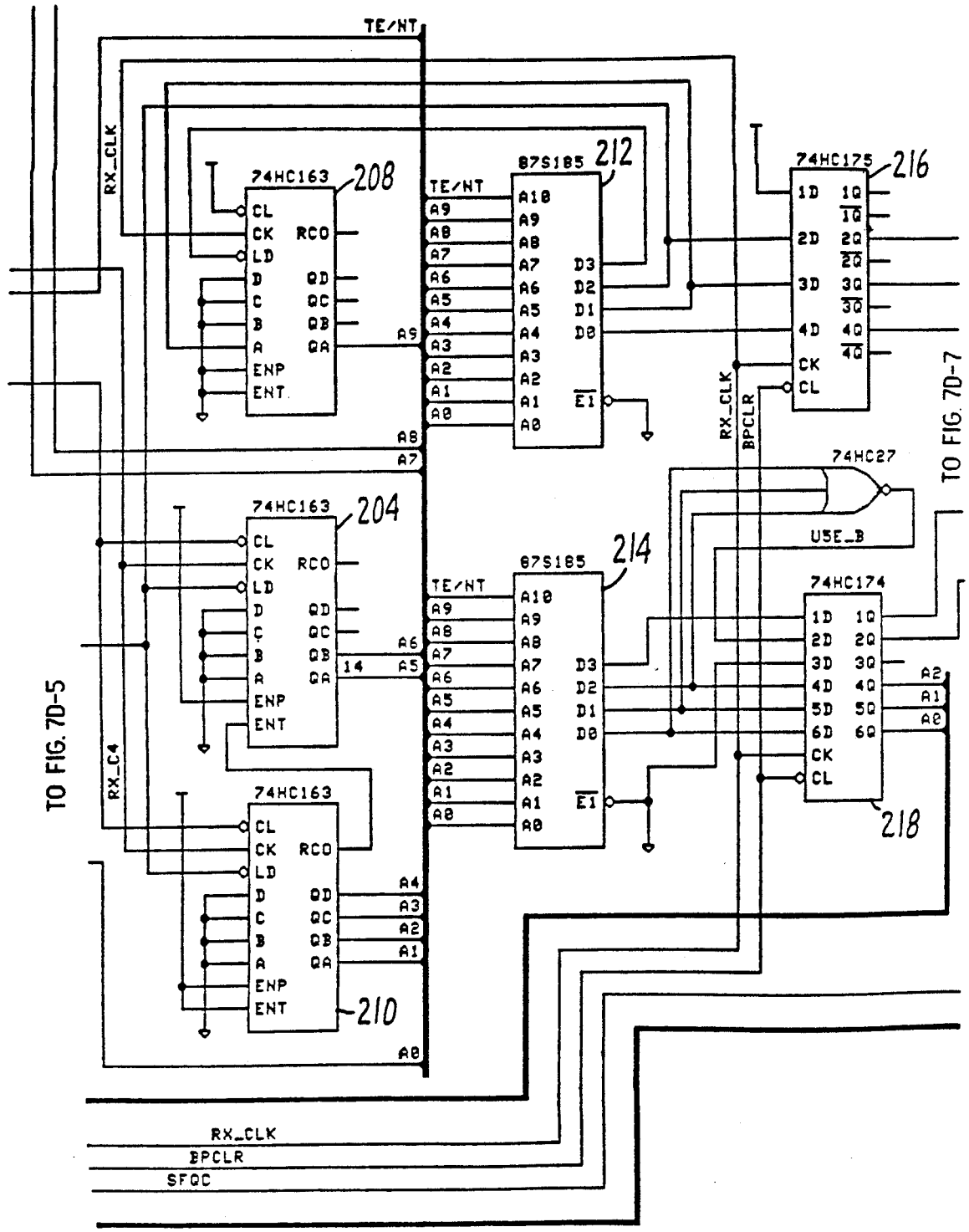
Figures 7, 7D:
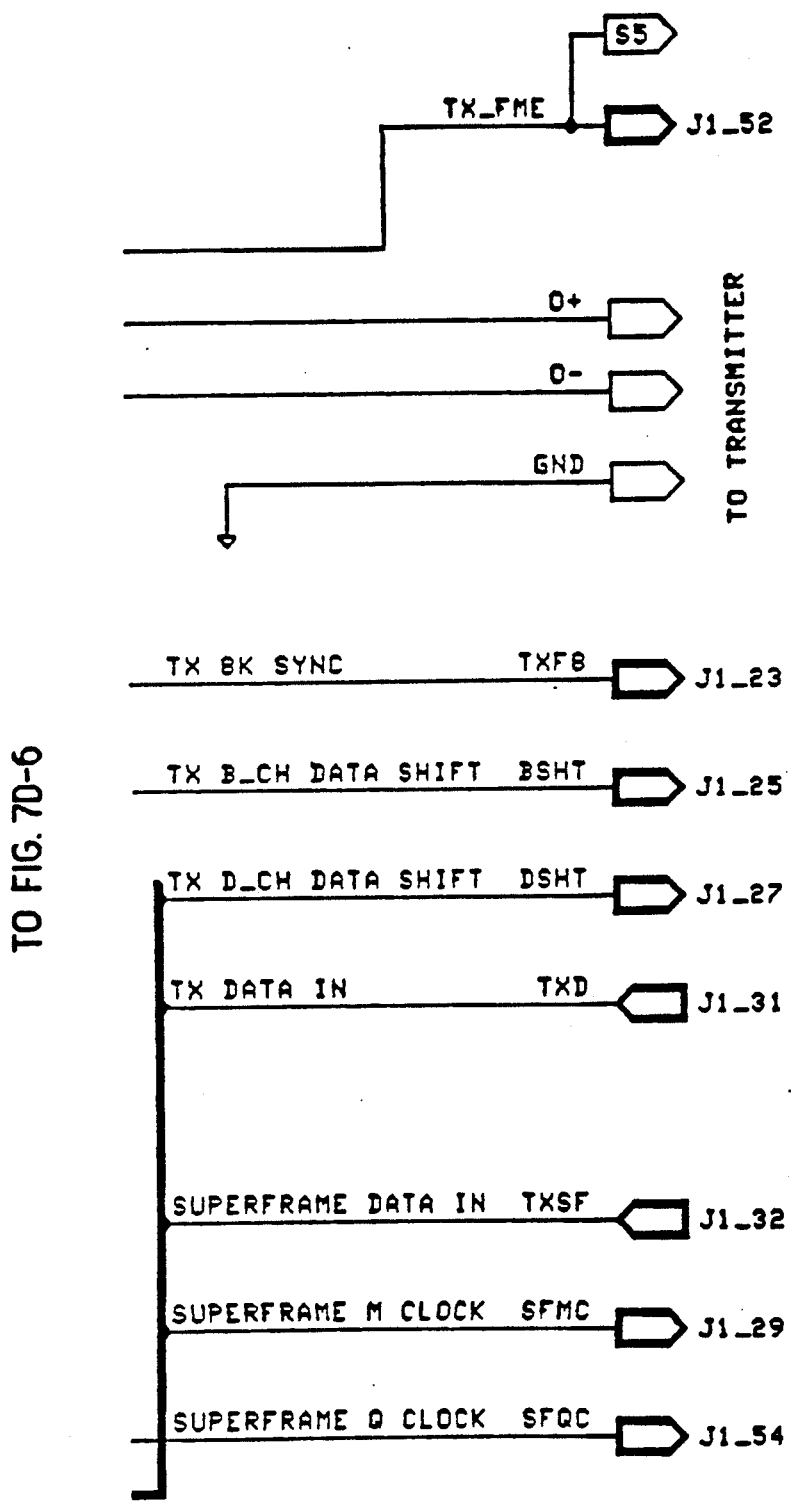

REferring to FIG. 7D-2, activate/deactivate logic is provided by components 180, 182, 184, 186, 188 and 190. The coding algorithm "ADLGC.src" for ROMs 180, 182 and 814 are provided in Appendix K at the end of this specification. Appendix L provides the recommended subroutines for external up and input latch circuit for AR (Activation Request), 1DR (Deactivation Request) and T31XP (Timer 3/1 expiry). Note that I124 indicates the receiving of INFO1(NT) or INFO2/4(TE). This signal is sent to the external microprocessor through the uwire for activation acknowledgment.

Components 192 and 194 (see FIG. 7D-5) form a frame counter for deriving superframe sequence, i.e. modulo=20 in NT mode, 5 in TE mode. Components 196 and 198 (see FIGS. 7D-4) form a superframe counter controller. In the TE mode, counter 192, 194 is synchronized to the SFT (superFrame trigger) signal from the frame trigger decoder described above. If >=3 consecutive SFT's, then the circuit assumes in lock, i.e. TE superframe TX channel is enabled. If three consecutive SFT pulses are found missing or INF00 is detected or the Frame synchronizer is out of lock, then the circuit assumes cut-of-lock, i.e. TE superframe TX channel is disabled. In the NT mode, counter 192, 194 is synchronized to transmitter. If TX equals INF04, then the superframe sequences are transmitted.

Component 200 (see FIG. 7D-5) provides superframe enable/disable and clock switching functions. Pin D3 of component 200 derives a "1 out of 20" frame sequence from the outputs of counter 192, 194 for generating the M clock SFMC in the NT mode if TX=INF04. The SFMC signal is switched to receive it's input from the frame synchronizer in the TE mode (i.e., pin D3 of component 200 is not active). In the NT mode, the M clock provides timing information to the transmit data processor 202 for encoding the M(SI) bit.

Pin D1 of component 200 derives a "1 out of 5" frame sequence from the outputs of counter 192, 194 for generating the Q clock SFQC. In the NT mode, the Q clock is enabled if TX=INF04. In the TE mode, the Q clock is enabled when Superframe timing is in lock This clock feeds two elements: transmit data processor 202 and frame synchronizer/lock detector 204 (see FIG. 7D-6). The first connection provides timing information to the transmitter for encoding the Fa/N (INF04) or Fa/L (INF03) bits. The second connection forbids the frame locking circuit 204 from responding to missing frame trigger pulses during superframes.

The S2 signal is the data output in the TE mode and can be decoded from RXC-DTA with RX-S2. The signal is also the S2 data input to the NT transmitter.

Referring to FIGS. 7D-5 and 7D-6, a transmit data processor/encoder is formed by components 206, 202, 208, 204, 210, 212, 214, 216 and 218. The signal TXD at pin A6 of component 202 is the TX B/D channel data input, 1=0+ or 0−. The B-channel data path is enabled by signals BSHT and TXF8 at pins 2Q and IQ, respectively, of component 218: channel B1 is selected when TXF8 is high and BSHT is high; channel B2 is selected when TXF82 is low and BSHT is high. The TXF8 signal also provides half-frame timing.

In the TE mode, the D-channel data path is enabled by DSHT at pin D1 of component 202. If the D-channel is not activated (DACT=low), then DSHT pulses are not outputed and transmit data is automatically set to binary 1. In the NT mode, the DRX signal at pin A4 of component 202 and the E-bit TX data input is connected to the D-channel RX output and multiplexed by component 202 into the TX data path. Pin A7 of component 202 provides the superframe data input (TE mode only).

In the NT mode, the transmitter is frame synchronized to an external source (U-Interface) by either shortening (39 counts) or widening (41 counts) the last L bit period. In the TE mode, the transmitter is frame synchronized to the RX-frame with a 2-bit offset.

As shown in FIG. 7D-1, components 220 and 222 provide TE/NT select. In NT modes, the receiver is configured as adaptive timing mode (similar to receiver in TE mode) for receiving asynchronous Info1 signal. After INFO1 is recognized, the receiver is switched back to normal mode. In the NT adaptive timing mode, if NT changes from the G3 state to the G2 state, due to loss of framing or upon receiving INF00, pin 3Q of component 222 will issue a low-going pulse for resetting the PLL locking circuitry, thus causing phase re-estimation of the second sampling clock.

Referring now to FIGS. 7E-1, 7E-2 and 7E-3, an NT frame synchronizer is formed by components 222, 224, 226, 228, 232, 2334 and 236. The NT receiving clock NTRCLK, pin QC of component 224, is at 192KHz and is generated by dividing 7.68MHz with a modulo of 40 in components 232 and 234. For each bit period, there are forty 7.68MHz clocks. The NT frame sync input signal NTFSYN at pin B of components 224 is provided for an external 8KHz sync signal to synchronize the framing of the transmitter. If there is no signal at this input, the transmitter frame clock provided at pin 49 of component 236 is free running at the sub-multiple (/40, 40 clocks per bit; and then /48, bits per frame) of the crystal frequency (7.68MHz). If an external sync signal is applied to this input, then the counters 232, 234 will either add or subtract a count during the last bit of each frame until the frame timing is frequency locked to the positive edges of the external input. The coding algorithm of component 236 does not allow consecutive opposite changes (e.g., 39 in one frame and 41 in the next frame): the counters have to step through the normal state (/40) before the next opposite change. The counters 115, 117 (FIG. 7B) used in the sampler clock processor are also frequency locked to the external sync signal in NT adaptive timing mode. This is accomplished by the signal BC3940 connecting between pin D2 of component 236 and pin ENP of component 117.

Figure 7E:
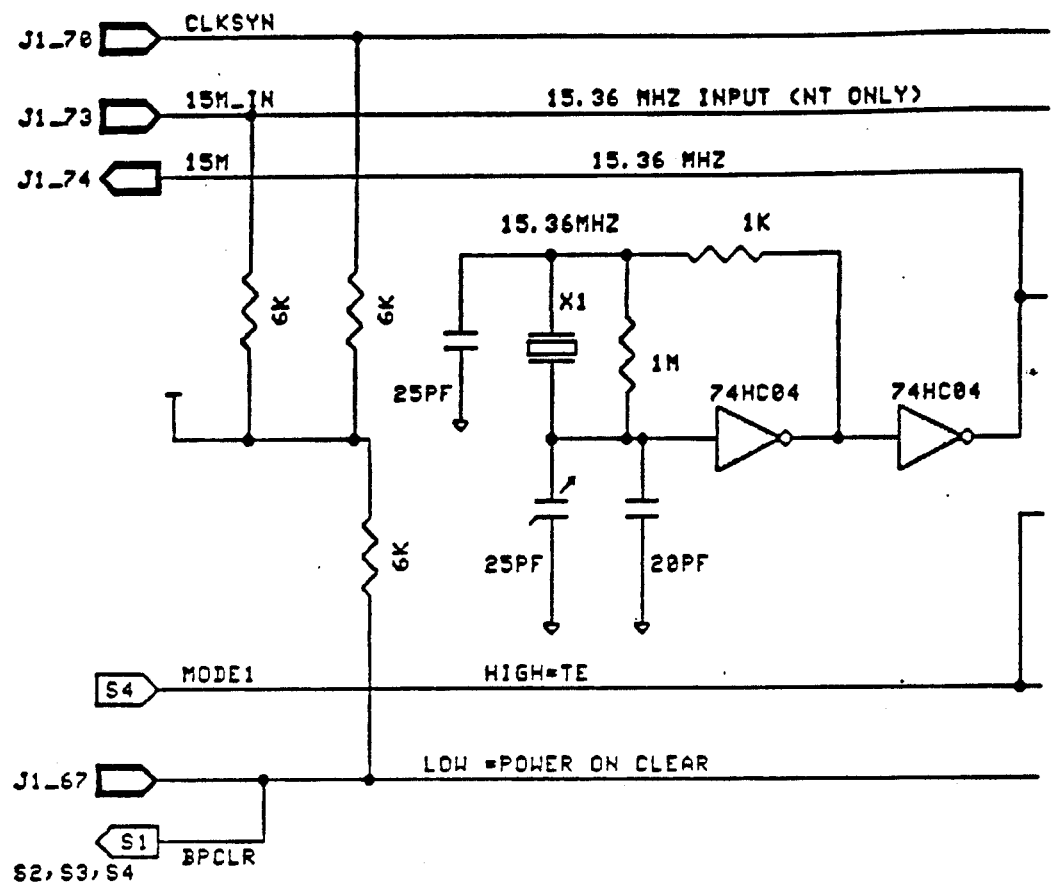
Figure 1:
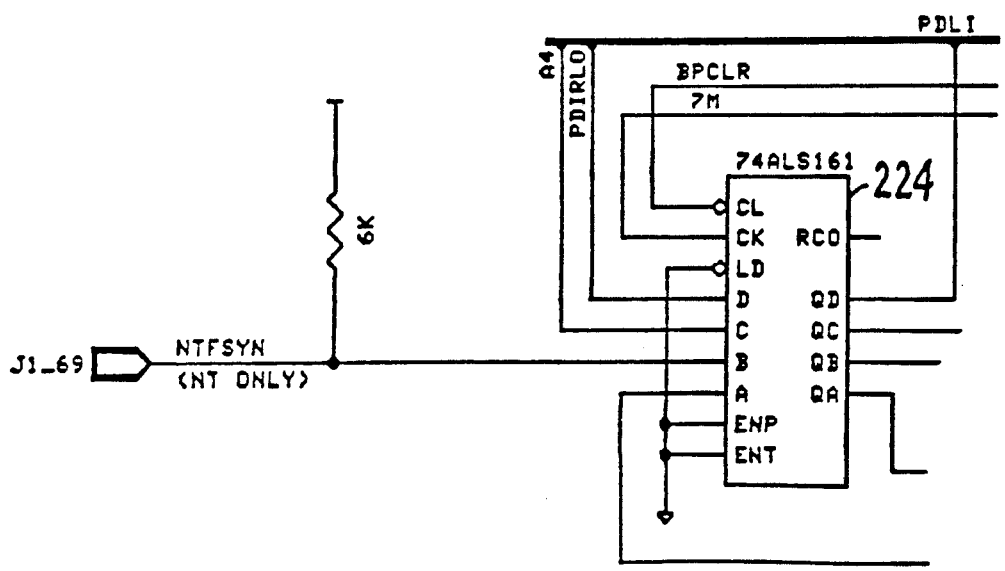
Figures 2, 7E:
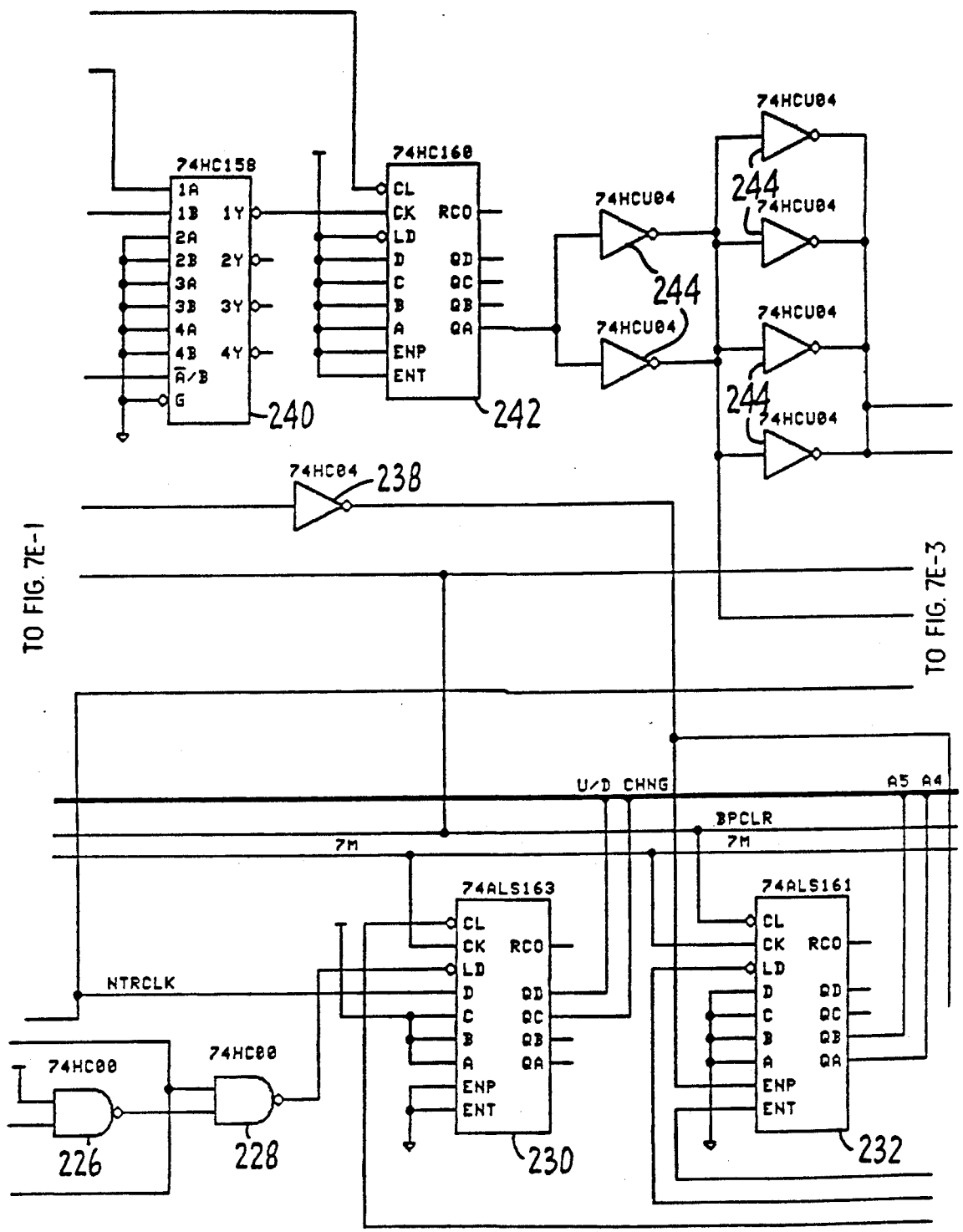

As shown in FIGS. 7E-2 and 7E-3, a system clock generator is formed by components 238, 240, 242, 244, 246 and 248. The clock input is 15.36 MHz crystal in the TE mode and 15.36 MHz external input in the NT mode from the U-Interface. The fixed timing sampling clock signal FTMCLK at pin QB of component 248 can be moved to other taps for different RX sampling timings; this connection only affects NT Fixed Timing mode.

It should be understood that various alternatives to the embodiment of the invention described herein may be employed in practicing the invention. It is intended that the following claims define the scope of the invention an that the structure within the scope of these claims and its equivalents be covered thereby.

What is claimed is:

1. An adaptive equalizer for compensating input signal frequency and phase distortions introduced in the input signal transmission media, the adaptive equalizer comprising frequency selection means responsive to the input signal and a feedback signal for generating an equalizer output signal having a selected frequency;

comparative means for slicing the equalizer output signal at predetermined levels to provide a comparator output signal;

a controller which receives the comparator output signal and provides a controller output signal representative of the voltage level of the comparator output signal; and digital filter means which receives the controller output signal and generates a corresponding binary signal as the feedback signal to the frequency selection means.

2. An adaptive equalizer as in claim 1 wherein the digital filter means is operable at more than one speed.

* * * * *